United States Patent
Hu et al.

(10) Patent No.: US 12,395,422 B2
(45) Date of Patent: Aug. 19, 2025

(54) ROUTE ADVERTISEMENT METHOD AND RELATED DEVICE

(71) Applicant: Huawei Technologies Co., Ltd., Shenzhen (CN)

(72) Inventors: Zhibo Hu, Beijing (CN); Ka Zhang, Beijing (CN); Sheng Fang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 157 days.

(21) Appl. No.: 18/154,939

(22) Filed: Jan. 16, 2023

(65) Prior Publication Data

US 2023/0155937 A1    May 18, 2023

Related U.S. Application Data

(63) Continuation of application No. PCT/CN2021/107119, filed on Jul. 19, 2021.

(30) Foreign Application Priority Data

| Jul. 17, 2020 | (CN) | 202010692883.2 |
| Nov. 10, 2020 | (CN) | 202011248687.2 |
| Nov. 11, 2020 | (CN) | 202011254841.7 |

(51) Int. Cl.
G06F 15/16 (2006.01)
H04L 45/02 (2022.01)
H04L 45/748 (2022.01)

(52) U.S. Cl.
CPC ........... *H04L 45/02* (2013.01); *H04L 45/04* (2013.01); *H04L 45/748* (2013.01)

(58) Field of Classification Search
CPC .............. H04L 45/748; H04L 45/04
USPC ................................................ 709/238
See application file for complete search history.

(56) References Cited

U.S. PATENT DOCUMENTS

| 2004/0196854 | A1* | 10/2004 | Thubert | H04L 45/00 370/395.31 |
| 2009/0257439 | A1* | 10/2009 | Xu | H04L 45/033 370/389 |
| 2016/0173415 | A1* | 6/2016 | Wang | H04L 12/4641 370/401 |
| 2018/0375685 | A1* | 12/2018 | Zhuang | H04L 45/74 |
| 2020/0145319 | A1* | 5/2020 | Joseph | H04L 45/12 |
| 2020/0313956 | A1* | 10/2020 | Heitz | H04L 49/1569 |

(Continued)

FOREIGN PATENT DOCUMENTS

| CN | 101014014 A | * 8/2007 | H04L 45/00 |
| CN | 101977150 A | * 2/2011 | |
| CN | 102546413 A | * 7/2012 | |

(Continued)

OTHER PUBLICATIONS

Machine translation of CN-101014014 (Year: 2007).*
Machine translation of CN-110535766 (Year: 2019).*
Unknown, "Understanding Route Aggregation in BGP", 2018, Cisco, https://web.archive.org/web/20180826193647/https://www.cisco.com/c/en/us/support/docs/ip/border-gateway-protocol-bgp/5441-aggregation.html (Year: 2018).*

(Continued)

*Primary Examiner* — Ruolei Zong
(74) *Attorney, Agent, or Firm* — Slater Matsil, LLP

(57) ABSTRACT

A first network device obtains a first route, where the first route includes a first route prefix. The first network device advertises a second route, where the second route includes a subnet prefix and a path identifier, and a range of the subnet prefix includes a range of the first route prefix.

19 Claims, 13 Drawing Sheets

(56) References Cited

U.S. PATENT DOCUMENTS

| | | | | |
|---|---|---|---|---|
| 2021/0273881 A1* | 9/2021 | Peng | ................... | H04L 45/245 |
| 2023/0155938 A1* | 5/2023 | Hu | ..................... | H04L 45/50 |
| | | | | 370/392 |

FOREIGN PATENT DOCUMENTS

| | | | | | |
|---|---|---|---|---|---|
| CN | 108259341 | A | | 7/2018 | |
| CN | 109218185 | A | * | 1/2019 | |
| CN | 110535766 | A | * | 12/2019 | ......... H04L 12/4625 |
| EP | 2099175 | A1 | * | 9/2009 | ............ H04L 45/02 |
| EP | 3860057 | A1 | | 8/2021 | |
| JP | 2004266822 | A | | 9/2004 | |
| JP | 2010199800 | A | | 9/2010 | |
| WO | WO-2020052641 | A1 | * | 3/2020 | ......... H04L 12/4633 |
| WO | 2020063500 | A1 | | 4/2020 | |
| WO | 2020083016 | A1 | | 4/2020 | |

OTHER PUBLICATIONS

Peter Psenak et al., "IGP Flexible Algorithm (draft-ietf-lsr-flex-algo-05)" (version 05), Nov. 2019, Internet Engineering Task Force (IETF) Network Working Group, https://datatracker.ietf.org/doc/draft-ietf-lsr-flex-algo/05/ (Year: 2019).*

Talaulikar et al., "Flexible Algorithm Definition Advertisement with BGP Link-State (draft-ietf-idr-bgp-ls-flex-algo-01)" (version 01), Jul. 2019, Internet Engineering Task Force (IETF) Network Working Group, https://datatracker.ietf.org/doc/draft-ietf-idr-bgp-ls-flex-algo/01/ (Year: 2019).*

Dawra G.et.al., "SRv6 BGP based Overlay services draft-ietf-bess-srv6-services-03", XP15140580A, Jul. 11, 2020, total 28 pages.

Zhou Chunning Dai Shaofu Peng ZTE Corp J:"Inter-domain Network Slicing via BGP-LU;draft-zhou-idr-inter-domain-lcu-01 .txt", Feb. 18, 2020 (Feb. 18, 2020), pp. 1-7, XP015137795.

C. Filsfils et al., "RFC 9256 Segment Routing Policy Architecture", Jul. 2022, total 35 pages.

* cited by examiner

200

201: A first network device obtains a first route, where the first route includes a first route prefix 202: The first network device advertises a second route, where the second route includes a subnet prefix and a path identifier, and a range of the subnet prefix includes a range of the first route prefix

ROUTE ADVERTISEMENT METHOD AND RELATED DEVICE

CROSS-REFERENCE TO RELATED APPLICATIONS

This application is a continuation of International Application No. PCT/CN2021/107119, filed on Jul. 19, 2021, which claims priority to Chinese Patent Application No. 202010692883.2, filed on Jul. 17, 2020 and Chinese Patent Application No. 202011248687.2, filed on Nov. 10, 2020 and Chinese Patent Application No. 202011254841.7, filed on Nov. 11, 2020. All of the aforementioned patent applications are hereby incorporated by reference in their entireties.

TECHNICAL FIELD

This application relates to the field of communications technologies, and in particular, to a route advertisement method and a related device.

BACKGROUND

Cloud computing is a new computing model in which computing tasks are distributed in a resource pool including a large quantity of computers, so that various application systems can obtain computing capabilities, storage space, and various software services as required. In a cloud computing system, a cloud server may be deployed in a centralized manner, and all application systems are run on the cloud server, so that a user (such as an individual user or an enterprise user) accesses the cloud server by using a terminal.

A manner in which a user accesses the cloud server by using a terminal is usually to establish an end-to-end connection tunnel between a metropolitan area network in which the terminal of the user is located and a backbone network in which a cloud service is located, so that the user accesses the cloud server based on the tunnel.

However, a large quantity of configurations are needed to establish the tunnel in this manner, and this leads to configuration complexity.

SUMMARY

This application provides a route advertisement method and a related apparatus, to reduce related configurations in a network.

According to a first aspect, a route advertisement method is provided. The method includes: A first network device obtains a first route, where the first route includes a first route prefix. The first network device advertises a second route, where the second route includes a subnet prefix and a path identifier, and a range of the subnet prefix includes a range of the first route prefix.

The subnet prefix and the path identifier are advertised in a route advertisement manner, which can reduce configurations required in a network, and especially, reduce tunnel-related configurations in the network.

In a possible implementation, the first network device further obtains a third route, where the third route includes the second route prefix. The first network device obtains the subnet prefix based on the second route prefix and the first route prefix. The route is advertised in an aggregation manner, which can further reduce a quantity of tunnels in the network.

In a possible implementation, the path identifier includes a network slice identifier.

In a possible implementation, the network slice identifier includes a flexible algorithm identifier.

The network slice identifier is carried in the route, so that a device in the network may further forward a corresponding packet based on the network slice identifier. This further reduces complexity of network configurations.

In a possible implementation, the second route is advertised by using an interior gateway protocol IGP packet. The IGP packet is used for advertisement, which can reduce difficulty of implementing this solution.

In a possible implementation, the first route is advertised by a second network device.

In a possible implementation, the second network device and the first network device belong to different IGP domains, or the second network device and the first network device belong to different BGP domains.

Routes from different domains are introduced and then issued, which can reduce complexity of inter-network configurations.

According to a second aspect, a route advertisement apparatus is provided. The apparatus includes: a receiving unit, configured to obtain a first route advertised by a second network device, where the first route includes a first route prefix; and a sending unit, configured to advertise a second route, where the second route includes a subnet prefix and a path identifier, and a range of the subnet prefix includes a range of the first route prefix.

In a possible implementation, the apparatus further includes a processing unit. The receiving unit is further configured to obtain a third route, where the third route includes a second route prefix. The processing unit is configured to obtain the subnet prefix based on the second route prefix and the first route prefix.

In a possible implementation, the path identifier includes a network slice identifier.

In a possible implementation, the network slice identifier includes a flexible algorithm identifier.

In a possible implementation, the second route is advertised by using an interior gateway protocol IGP packet.

According to a third aspect, a network device is provided, including a processor and a communication interface. The processor is configured to execute instructions, so that the network device performs the method according to the first aspect.

According to a fourth aspect, a network system is provided. The network system includes the network device according to the second aspect or the third aspect.

According to a fifth aspect, a data processing method is provided, including: A first network device obtains a first subnet prefix, where the first subnet prefix is a destination identifier of a traffic engineering tunnel, and the subnet prefix may include two fields: an IP address and a mask. For example, the subnet prefix may be A1::1/32. The first network device performs data processing based on the obtained first subnet prefix. Because the destination identifier of the traffic engineering tunnel includes the subnet prefix, the traffic engineering tunnel may match a plurality of packets with different destination addresses, so that a quantity of traffic engineering tunnels in a network can be reduced, and configuration or management complexity can be avoided.

In a possible implementation, that the first network device performs data processing based on the first subnet prefix includes: The first network device obtains a first packet. If there is a longest match between a first address and the first subnet prefix, the first network device sends the first packet through the traffic engineering tunnel, where the first address is obtained based on a destination address of the first packet.

In a possible implementation, the first address includes: the destination address of the first packet or a next-hop forwarding address determined by the first network device based on the first packet.

When forwarding the packet, the network device forwards the packet based on a longest match between forwarding information of the packet and the subnet prefix. This avoids configuring related information such as tunnels one by one based on packet features, reduces a quantity of tunnels, and improves packet forwarding efficiency.

In a possible implementation, the traffic engineering tunnel may include a segment routing policy (SR Policy) or segment routing traffic engineering (SR TE tunnel).

In a possible implementation, that the first network device performs data processing based on the first subnet prefix includes: The first network device advertises a first routing packet based on the first subnet prefix, where the first routing packet includes a second subnet prefix, and a range of the second subnet prefix includes a range of the first subnet prefix.

In a possible implementation, the first routing packet includes an interior gateway protocol IGP packet.

In a possible implementation, the first routing packet further includes a path identifier.

In a possible implementation, the path identifier includes a segment identifier SID included in the first network device, and the first route further includes a mapping relationship between the SID and a network slice identifier.

According to a sixth aspect, a data processing method is provided, including: A first network device sends a traffic engineering tunnel to a second network device, where a destination identifier of the traffic engineering tunnel includes a subnet prefix.

The traffic engineering tunnel may be used to enable the second network device to match the traffic engineering tunnel in a longest match manner of the subnet prefix, so that a quantity of tunnels in a network is reduced.

In a possible implementation, the traffic engineering tunnel includes a segment routing policy SR policy or a segment routing traffic engineering SR TE tunnel.

According to a seventh aspect, a data processing method is provided, including: A first network device obtains a first route issued by a second network device, where the first route includes a first route prefix and a first address. The first network device obtains a second route issued by an intermediate network device, where the second route includes a first subnet prefix and a path identifier. A range of the first subnet prefix includes the first address. The first network device receives a first packet, where there is a longest match between a destination address of the first packet and the first route prefix. The first network device updates the first packet to obtain a second packet. The first network device sends the second packet through an egress, where the egress is determined by the first network device based on the path identifier.

In a manner in which the second route issued by the intermediate network device corresponds to the first route issued by the second network device, after receiving the packet, the first network device may determine, based on that the destination address of the packet corresponds to the first route, to forward the packet by using the second route. That is, in a network, a tunnel or a path for sending the packet is determined in a manner of the subnet prefix, which can reduce a quantity of tunnels or traffic engineering tunnels in the network, and avoid configuration or management complexity.

In a possible implementation, the first address includes a next-hop address or a first segment identifier (SID).

In a possible implementation, that the first network device updates the first packet to obtain a second packet includes: The first network device determines, based on the longest match between the destination address of the first packet and the first route prefix, that a next-hop address corresponding to the first packet is the first SID. The first network device updates the first packet to obtain the second packet, where the second packet includes the first SID.

After determining, in a longest match manner, that the destination address of the first packet matches the first route prefix, the first network device encapsulates, in the packet, the first SID indicating forwarding. This ensures that a subsequent network device can forward the packet based on the first SID, ensures that the first packet can be forwarded based on the first SID, and improves implementability of this solution. In a possible implementation, the path identifier includes a first network slice identifier or a second SID, and the second SID is an SID of the intermediate network device.

In a possible implementation, if the path identifier is the second SID, the second route further includes a mapping relationship between the second SID and a second network slice identifier.

The first network slice identifier or the second SID is used to represent the path identifier, so that modifications to a conventional technology can be minimized, and implementability of this solution is improved.

In a possible implementation, the second packet further includes the path identifier. When the path identifier is a network slice identifier, a hop-by-hop header of the second packet includes the network slice identifier.

In a possible implementation, before that the first network device sends the second packet through an egress, the method further includes: The first network device generates a correspondence between the first address and the path identifier based on a longest match between the first address and the first subnet prefix.

The first network device pre-generates a correspondence between the first SID and the path identifier, so that when obtaining the second packet including the first SID, the first network device may determine, based on the correspondence, an egress corresponding to the path identifier. This saves time for matching the first SID and the path identifier, and improves forwarding efficiency.

In a possible implementation, the method further includes: The first network device generates a correspondence between the first address and an identifier of the egress based on a longest match between the first address and the first subnet prefix.

The first network device pre-generates a correspondence between the first SID and the egress, so that when obtaining the second packet including the first SID, the first network device may determine, based on the correspondence, an egress corresponding to the first SID. This saves path computation time during forwarding, and improves forwarding efficiency.

In a possible implementation, the path identifier includes: a network slice identifier or a second SID included in the intermediate network device. The network slice identifier may be, for example, a FlexAlgo ID, and the second SID may be, for example, an END SID.

In a possible implementation, the second packet further includes the path identifier.

In a possible implementation, the path identifier includes a network slice identifier, and the network slice identifier is carried in a hop-by-hop header of the second packet.

In a possible implementation, the second route is an interior gateway protocol (IGP) route. The intermediate network device issues the IGP route to the first network device according to the IGP protocol, so that modifications to a conventional technology can be minimized, and implementability of this solution is improved.

In a possible implementation, the intermediate network device is located between the first network device and the second network device, the first network device and the second network device belong to different IGP domains, the first network device and the intermediate network device belong to a same IGP domain, and the intermediate network device is a border network device in the IGP domain.

In a possible implementation, the first network device includes a provider edge (PE) device.

In a possible implementation, the second network device includes a segment routing PE device.

In a possible implementation, the first SID includes a virtual private network (VPN) segment identifier VPN SID.

According to an eighth aspect, a data processing method is provided, including: An intermediate network device obtains a first subnet prefix and a path identifier, where the first subnet prefix is a destination identifier of a first traffic engineering tunnel, and the first traffic engineering tunnel corresponds to the path identifier. The intermediate network device issues a route advertisement packet, where the route advertisement packet includes a second subnet prefix and the path identifier, and a range of the second subnet prefix includes a range of the first subnet prefix.

After obtaining the first traffic engineering tunnel including the second subnet prefix, the intermediate network device issues the route advertisement packet carrying the first subnet prefix, and the range of the first subnet prefix includes the range of the second subnet prefix, so that when receiving a packet whose destination address matches the second subnet prefix, a network device that receives the route advertisement packet can send the packet to the intermediate network device, and the intermediate network device then forwards the packet based on the first traffic engineering tunnel. This reduces a quantity of tunnels or traffic engineering tunnels in a network, avoids configuration or management complexity.

In a possible implementation, the first traffic engineering tunnel further includes a segment identifier list, and after the issuing a route advertisement packet, the method further includes: The intermediate network device receives a first packet. The intermediate network device updates the first packet based on a longest match between a destination address of the first packet and the first subnet prefix, to obtain a second packet, where the second packet includes the segment identifier list. The intermediate network device sends the second packet.

When receiving the second packet including a first SID, the intermediate network device may update the second packet based on the segment identifier list included in the first traffic engineering tunnel, to obtain a third packet, and the intermediate network device may forward the third packet based on the segment identifier list. This ensures that the third packet can be forwarded to a second network device.

In a possible implementation, the destination address of the first packet includes the first segment identifier SID.

In a possible implementation, the route advertisement packet is generated by the first network device in response to obtaining the first traffic engineering tunnel and the path identifier.

In a possible implementation, the intermediate network device determines, based on a correspondence, that the second subnet prefix corresponds to the path identifier.

In a possible implementation, the first traffic engineering tunnel includes a segment routing policy SR policy, the SR policy includes a color identifier, and the correspondence includes a correspondence between the color identifier and the path identifier.

In a possible implementation, the correspondence includes a correspondence between the first subnet prefix and the path identifier.

The intermediate network device may determine, based on the correspondence between the path identifier and the color identifier, the path identifier corresponding to the SR policy. This improves implementability of this solution.

In a possible implementation, the first traffic engineering tunnel includes an SR policy, and before that the intermediate network device issues a route advertisement packet, the method further includes: The intermediate network device obtains a correspondence between the first subnet prefix and the path identifier. The intermediate network device determines, based on the first subnet prefix and the correspondence, that the SR policy corresponds to the path identifier.

In a possible implementation, before that the intermediate network device issues a route advertisement packet, the method further includes: The intermediate network device obtains a second traffic engineering tunnel, where the second traffic engineering tunnel includes a third subnet prefix. The intermediate network device determines that the second traffic engineering tunnel corresponds to the path identifier. The intermediate network device determines the second subnet prefix based on the first subnet prefix and the third subnet prefix, where the range of the second subnet prefix includes the range of the first subnet prefix and a range of the third subnet prefix.

When obtaining a plurality of traffic engineering tunnels, the intermediate network device may obtain an aggregated subnet prefix based on subnet prefixes of the plurality of traffic engineering tunnels, so that the aggregated subnet prefix is carried in a process of issuing the route advertisement packet. This reduces a quantity of route advertisement packets, and saves packet overheads.

In a possible implementation, the path identifier includes a first network slice identifier or a second SID, and the second SID is an SID of the intermediate network device.

In a possible implementation, when the path identifier is the second SID included in the intermediate network device, the second route further includes a mapping relationship between the second SID and a second network slice identifier.

In a possible implementation, the intermediate network device issues the route advertisement packet in an IGP domain in which the intermediate network device is located.

According to a fifth aspect, a data processing method is provided, including: A first network device obtains a subnet prefix and a segment identifier list, where the subnet prefix is a destination identifier of a traffic engineering tunnel. The first network device receives a first route issued by a second network device, where the first route includes a route prefix and a first address, and a range of the subnet prefix includes the first address. The first network device receives a first packet, where there is a longest match between a destination address of the first packet and the route prefix. The first network device updates the first packet to obtain a second packet, where the second packet includes an SID and a segment identifier list. The first network device sends the second packet.

In a possible implementation, the first address includes a next-hop address or a segment identifier SID of the second network device.

In a possible implementation, when the first address is the SID, the second packet further includes the SID.

In a possible implementation, the method further includes: The first network device generates, based on a longest match between the next-hop address and the subnet prefix, a correspondence including the route prefix and the segment identifier list.

The first network device pre-generates the correspondence between the route prefix and the segment identifier list, so that when receiving the packet whose destination address matches the route prefix, the first network device may determine the corresponding segment identifier list, to forward the packet. This improves packet forwarding efficiency.

In a possible implementation, that the first network device updates the first packet includes: The first network device updates the segment identifier list in the first packet based on the longest match between the destination address of the first packet and the route prefix and the correspondence, to obtain the second packet.

In a possible implementation, the traffic engineering tunnel includes an SR policy, the SR policy further includes a color identifier, the first route further includes the path identifier, and before that the first network device updates the first packet, the method further includes: The first network device determines, based on that the path identifier corresponds to the color identifier, that the first route corresponds to the traffic engineering tunnel.

In a process of determining whether the first route matches the traffic engineering tunnel, whether the color identifier in the traffic engineering tunnel matches the path identifier is further compared, to ensure that a service requirement corresponding to the traffic engineering tunnel is the same as a service requirement corresponding to the path identifier. This ensures packet forwarding quality.

In a possible implementation, the path identifier includes a network slice identifier or a color identifier.

In a possible implementation, the traffic engineering tunnel includes a segment routing traffic engineering SR TE tunnel.

In a possible implementation, the SID includes a virtual private network segment identifier VPN SID.

In a possible implementation, the first network device includes a PE device.

In a possible implementation, the second network device includes the PE device.

According to a ninth aspect, a network device is provided, including a processor and a communication interface. The processor is configured to execute instructions, so that the network device performs the method according to any implementation of the first aspect.

According to a tenth aspect, a network device is provided, including a processor and a communication interface. The processor is configured to execute instructions, so that the network device performs the method according to any implementation of the second aspect.

According to an eleventh aspect, a communication system is provided. The network system includes the network device according to the sixth aspect and the network device according to the seventh aspect.

According to a twelfth aspect, a network device is provided, including a processor and a communication interface. The processor is configured to execute instructions, so that the network device performs the method according to any implementation of the third aspect.

According to a thirteenth aspect, an intermediate network device is provided, including a processor and a communication interface. The processor is configured to execute instructions, so that the intermediate network device performs the method according to any implementation of the fourth aspect.

According to a fourteenth aspect, a network device is provided, including a processor and a communication interface. The processor is configured to execute instructions, so that the network device performs the method according to any implementation of the fifth aspect.

According to a fifteenth aspect, a network system is provided. The network system includes the network device according to the ninth aspect and/or the intermediate network device according to the tenth aspect.

In a possible implementation, the network system further includes the network device according to the eleventh aspect.

According to a sixteenth aspect, a network system is provided. The network system includes a first network device, a first intermediate network device, a second intermediate network device, and a second network device. The first intermediate network device obtains a first subnet prefix and a second subnet prefix, where the first subnet prefix is a destination identifier of a first traffic engineering tunnel, and the second subnet prefix is a destination identifier of a second traffic engineering tunnel. The first intermediate network device sends a first route advertisement packet, where the first route advertisement packet includes a third subnet prefix, and the first intermediate network device obtains the third subnet prefix by aggregating the first subnet prefix and the second subnet prefix. The second intermediate network device obtains the first route advertisement packet. The second intermediate network device receives a first packet sent by the second network device, where there is a longest match between a destination address of the packet and the third subnet prefix. The second intermediate network device obtains a second packet based on the first packet, and sends the second packet to the first intermediate network device.

In a possible implementation, before that the second intermediate network device receives a packet sent by the second network device, the method further includes: The second intermediate network device obtains a first segment identifier SID corresponding to the third subnet prefix. The second intermediate network device issues a second route advertisement packet, where the second route advertisement packet includes the third subnet prefix, a first SID, and a first algorithm identifier, and the first SID corresponds to the first algorithm identifier.

In a possible implementation, the first packet further includes the first SID.

In a possible implementation, the method further includes: The second intermediate network device obtains at least one network slice corresponding to the third subnet prefix, where the at least one network slice includes a second network slice. The second intermediate network device issues a third route advertisement packet, where the third route advertisement packet includes the third subnet prefix and an identifier of the second network slice. The second network device obtains the third route advertisement packet, and determines a corresponding egress for the third subnet prefix based on the identifier of the second network slice.

In a possible implementation, a hop-by-hop header of the first packet carries the identifier of the second network slice.

In a possible implementation, the second intermediate network device and the second network device belong to a same IGP domain, and the first network device and the second network device belong to different IGP domains.

An eighteenth aspect of this application provides a computer storage medium. The computer storage medium may be nonvolatile. The computer storage medium stores computer-readable instructions. When the computer-readable instructions are executed by a processor, the method according to any implementation of the first aspect, the second aspect, the third aspect, the fourth aspect, the fifth aspect, the sixth aspect, the seventh aspect, or the eighth aspect is implemented.

A nineteenth aspect of this application provides a computer program product including instructions. When the computer program product runs on a computer, the computer is enabled to perform the method according to any implementation of the first aspect, the second aspect, the third aspect, the fourth aspect, the fifth aspect, the sixth aspect, the seventh aspect, or the eighth aspect.

A twentieth aspect of this application provides a chip system. The chip system includes a processor, configured to support a network device in implementing functions in the foregoing aspects, for example, sending or processing data and/or information in the foregoing methods. In a possible design, the chip system further includes a memory. The memory is configured to store program instructions and data for the network device. The chip system may include a chip, or may include a chip and another discrete device.

A twenty-first aspect of this application provides a network device, including: a sending unit, a processing unit, and a receiving unit. The receiving unit is configured to obtain a first subnet prefix, where the first subnet prefix is a destination identifier of a traffic engineering tunnel. The processing unit is configured to perform data processing based on the first subnet prefix.

In a possible implementation, the receiving unit is further configured to obtain a first packet. If there is a longest match between a first address and the first subnet prefix, the sending unit is configured to send the first packet through the traffic engineering tunnel, where the first address is obtained based on a destination address of the first packet.

In a possible implementation, the first address includes: the destination address of the first packet or a next-hop forwarding address determined by the network device based on the destination address.

In a possible implementation, the sending unit is further configured to advertise a first routing packet based on the first subnet prefix, where the first routing packet includes a second subnet prefix, and a range of the second subnet prefix includes a range of the first subnet prefix.

In a possible implementation, the first routing packet includes an interior gateway protocol IGP packet.

In a possible implementation, the traffic engineering tunnel includes a segment routing policy SR policy tunnel or a segment routing traffic engineering SR TE tunnel.

A twenty-second aspect of this application provides a network device, including: a sending unit, a processing unit, and a receiving unit. The sending unit is configured to send a traffic engineering tunnel to a second network device, where a destination identifier of the traffic engineering tunnel includes a subnet prefix.

In a possible implementation, the traffic engineering tunnel includes a segment routing policy SR policy or a segment routing traffic engineering SR TE tunnel.

A twenty-third aspect of this application provides a network device, including: a sending unit, a processing unit, and a receiving unit. The receiving unit is configured to obtain a first route advertised by a second network device, where the first route includes a first route prefix and a first address. The receiving unit is further configured to obtain a second route issued by an intermediate network device, where the second route includes a first subnet prefix and a path identifier, and a range of the first subnet prefix includes the first address. The receiving unit is configured to receive a first packet, where there is a longest match between a destination address of the first packet and the first route prefix. The processing unit is configured to update a first packet to obtain a second packet. The sending unit is configured to send the second packet through an egress, where the egress is determined by the first network device based on the path identifier.

In a possible implementation, the first address is a next-hop address or a first segment identifier SID.

In a possible implementation, the processing unit is further configured to determine, based on the longest match between the destination address of the first packet and the first route prefix, that an address corresponding to the first packet is the first SID. The processing unit is further configured to update the first packet to obtain a second packet, where the second packet includes the first SID.

In a possible implementation, the path identifier includes a first network slice identifier or a second SID, and the second SID is an SID of the intermediate network device.

In a possible implementation, if the path identifier is the second SID, the second route further includes a mapping relationship between the second SID and a second network slice identifier.

In a possible implementation, the second packet further includes the path identifier.

In a possible implementation, the path identifier includes the network slice identifier, and a hop-by-hop header of the second packet includes the network slice identifier.

In a possible implementation, the second route is an interior gateway protocol IGP route.

In a possible implementation, the intermediate network device is located between the first network device and the second network device, the first network device and the second network device belong to different IGP domains, the first network device and the intermediate network device belong to a same IGP domain, and the intermediate network device is a border network device in the IGP domain.

In a possible implementation, the first network device is a provider edge PE device.

In a possible implementation, the second network device includes the PE device.

In a possible implementation, the first SID includes a virtual private network segment identifier VPN SID.

In a possible implementation, the processing unit is further configured to generate a correspondence between the first address and the path identifier based on a longest match between the first address and the first subnet prefix.

In a possible implementation, the processing unit is further configured to generate a correspondence between the first address and an identifier of the egress based on a longest match between the first address and the first subnet prefix.

A twenty-fourth aspect of this application provides a network device, including: a sending unit, a processing unit, and a receiving unit. The receiving unit is configured to obtain a first subnet prefix and a path identifier, where the first subnet prefix is a destination identifier of a first traffic engineering tunnel, and the first traffic engineering tunnel corresponds to the path identifier. The sending unit is configured to issue a route advertisement packet, where the route advertisement packet includes a second subnet prefix and the path identifier, and a range of the second subnet prefix includes a range of the first subnet prefix.

In a possible implementation, the first traffic engineering tunnel further includes a segment identifier list, and the receiving unit is further configured to receive a first packet. The processing unit is further configured to update the first packet based on a longest match between a destination address of the first packet and the first subnet prefix, to obtain a second packet, where the second packet includes the segment identifier list. The sending unit is further configured to send a second packet.

In a possible implementation, the destination address of the first packet includes a first segment identifier SID.

In a possible implementation, the route advertisement packet is generated by the first network device in response to obtaining the first traffic engineering tunnel.

In a possible implementation, the processing unit is further configured to determine, based on a correspondence, that the second subnet prefix corresponds to the path identifier.

In a possible implementation, the first traffic engineering tunnel includes a segment routing policy SR policy, the SR policy includes a color identifier, and the correspondence includes a correspondence between the color identifier and the path identifier.

In a possible implementation, the correspondence includes a correspondence between the first subnet prefix and the path identifier.

In a possible implementation, the receiving unit is further configured to obtain a second traffic engineering tunnel, where the second traffic engineering tunnel includes a third subnet prefix. The processing unit is further configured to determine that the second traffic engineering tunnel corresponds to the path identifier. The processing unit is further configured to determine the second subnet prefix based on the first subnet prefix and the third subnet prefix, where the range of the second subnet prefix includes the range of the first subnet prefix and a range of the third subnet prefix.

In a possible implementation, the path identifier includes a first network slice identifier or a second SID, and the second SID is an SID of the intermediate network device.

In a possible implementation, when the path identifier is the second SID included in the intermediate network device, the second route further includes a mapping relationship between the second SID and a second network slice identifier.

In a possible implementation, the receiving unit issues a route advertisement packet in an IGP domain in which the network device is located.

A twenty-fifth aspect of this application provides a network device, including: a sending unit, a processing unit, and a receiving unit. The receiving unit is configured to obtain a subnet prefix and a segment identifier list, where the subnet prefix is a destination identifier of a traffic engineering tunnel. The receiving unit is further configured to obtain a first route, where the first route includes a route prefix and a first address, and a range of the subnet prefix includes the first address. The receiving unit is further configured to receive a first packet, where there is a longest match between a destination address of the first packet and the route prefix. The processing unit is further configured to update the first packet to obtain a second packet, where the second packet includes the segment identifier list. The sending unit is further configured to send a second packet.

In a possible implementation, the first address includes a next-hop address or a segment identifier SID of a second network device.

In a possible implementation, when the first address is the SID, the second packet further includes the SID.

In a possible implementation, the processing unit is further configured to generate, based on a longest match between the first address and the subnet prefix, a correspondence including the route prefix and the segment identifier list.

In a possible implementation, the processing unit is further configured to update the segment identifier list in the first packet based on the longest match between the destination address of the first packet and the route prefix and the correspondence, to obtain the second packet.

In a possible implementation, the traffic engineering tunnel includes an SR policy, the SR policy further includes a color identifier, and the first route further includes a path identifier. The processing unit is further configured to determine, based on that the path identifier corresponds to the color identifier, that the first route corresponds to the traffic engineering tunnel.

In a possible implementation, the path identifier includes the color identifier.

In a possible implementation, the traffic engineering tunnel includes a segment routing traffic engineering SR TE tunnel.

In a possible implementation, the SID includes a virtual private network segment identifier VPN SID.

In a possible implementation, the network device and/or the second network device include a PE device.

DETAILED DESCRIPTION OF ILLUSTRATIVE EMBODIMENTS

Figure 1:
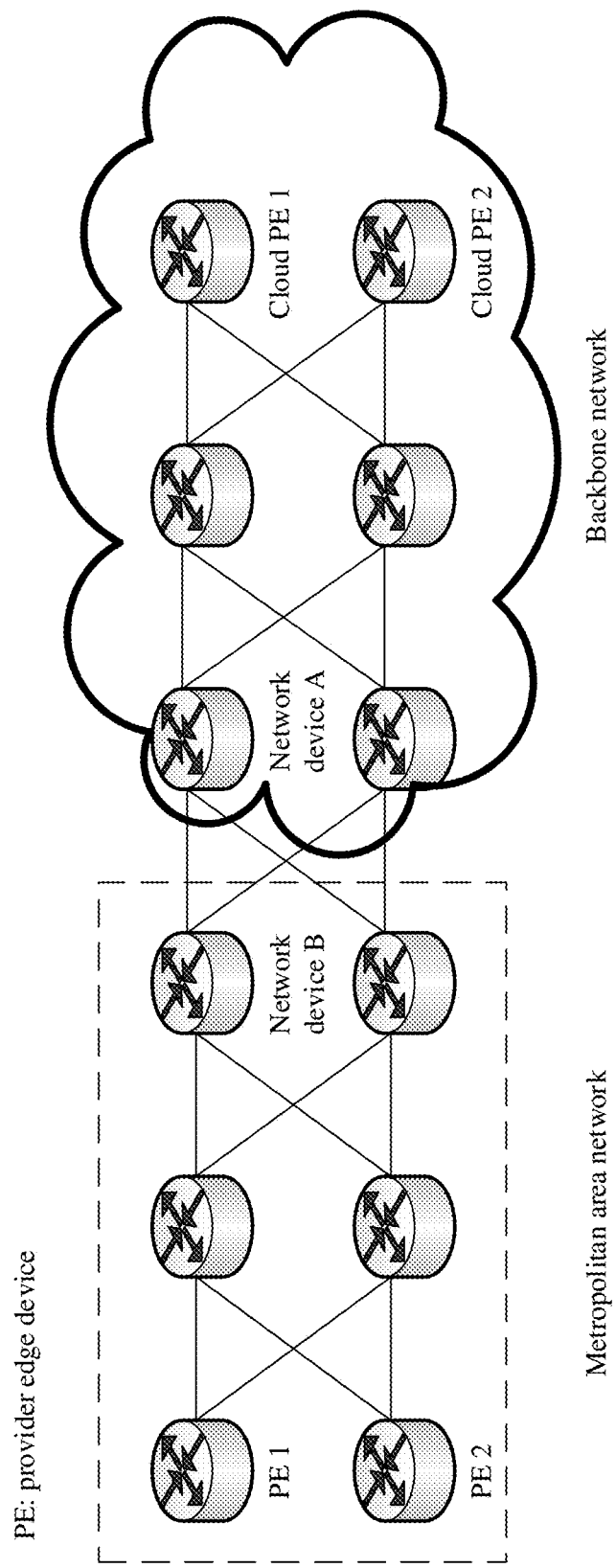
FIG. 1 is a schematic diagram of a network architecture according to an embodiment of this application.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances, so that embodiments of this application described herein can be implemented in an order other than the order illustrated or described herein. Moreover, the terms "include", "correspond to" and any other variants thereof are intended to cover non-exclusive inclusion. For example, a process, method, system, product, or device that includes a list of steps or units is not necessarily limited to those steps or units that are expressly listed, but may include other steps or units that are not expressly listed or inherent to the process, method, product, or device.

In embodiments of this application, the word such as "for example" is used to represent giving an example, an illustration, or a description. Any embodiment or design solution described as an "example" or "for example" in embodiments of this application should not be explained as being more preferred or having more advantages than another embodiment or design solution. Exactly, use of the word "example", "for example", or the like is intended to present a related concept in a specific manner.

For ease of understanding, the following first describes technical terms in embodiments of this application.

Segment routing (Segment Routing, SR) is a protocol designed based on an idea of source routing to forward data packets in a network. The SR divides a network path into segments and allocates segment identifiers (Segment IDs, SIDs) to the segments and network nodes. An SID list (SID List, also referred to as a label stack in SR-MPLS) may be obtained by sorting the SIDs in order. The SID list may indicate a forwarding path. With an SR technology, a node and a path through which a data packet carrying the SID list passes may be specified, to meet a traffic optimization requirement. To make an analogy, the data packet may be compared to luggage, and the SR may be compared to attaching a label to the luggage. If the luggage needs to be sent from a region A to a region D through a region B and a region C, a label indicating to "go to the region B first, then to the region C, and finally to the region D" may be attached to the luggage in the origin region A. In this way, the label on the luggage simply needs to be identified in each region, and the luggage may be forwarded from one region to another region based on the label of the luggage. In the SR technology, a headend adds a label to the data packet, and an intermediate node may forward the data packet to a next node based on the label until the data packet arrives at a destination node. For example, <SID 1, SID 2, SID 3> is inserted into a packet header of a data packet, and the data packet is first forwarded to a node corresponding to the SID 1, then forwarded to a node corresponding to the SID 2, and then forwarded to a node corresponding to the SID 3. SR-MPLS is short for segment routing multi-protocol label switching (Segment Routing Multi-Protocol Label Switching).

Internet protocol version 6 (IPv6)-based segment routing (SRv6) indicates applying the SR technology to an IPv6 network. An IPv6 address (128 bits) is used as a representation of an SID. When forwarding a data packet, a network device supporting SRv6 queries a local segment identifier table (local SID table) based on a destination address (DA) of the data packet. If there is a longest match between the destination address of the data packet and any SID in the local segment identifier table, the network device performs, according to a policy related to the SID in the local segment identifier table, an operation corresponding to the policy, for example, may forward the data packet through an outbound interface corresponding to the SID. If there is no longest match between the destination address of the data packet and each SID in the local segment identifier table, the network device queries an IPv6 forwarding table, and performs longest match forwarding based on the IPv6 forwarding table.

Segment routing header (SRH): An IPv6 packet includes an IPv6 standard header, an extension header (o, . . . , n), and a payload Payload. To implement SRv6 based on an IPv6 forwarding plane, an IPv6 extension header referred to as an SRH extension header is added. The extension header specifies an IPv6 explicit path and stores IPv6 segment list information. A function of the extension header is the same as that of a segment list in SR-MPLS. The headend adds an SRH extension header to the IPv6 packet, so that an intermediate node may forward the packet based on path information included in the SRH extension header. Specifically, the SRH has two pieces of key information. One is a segment list in an IPv6 address form, and is similar to label stack information in a multiprotocol label switching (MPLS) network. The segment list including a plurality of segment identifiers (SID) arranged in order indicates an explicit path in the SR. The other is a segment left (SL). The SL is a pointer indicating a current segment identifier.

On an SRv6 network, a value of a DA field in an IPv6 packet constantly changes. The value of the DA field is determined by both the SL and the segment list. When the pointer SL points to a to-be-processed segment, for example, a segment list [2], an IPv6 address of the segment list [2] needs to be copied to the DA field.

On a forwarding plane, if a node supports the SR, and a segment identifier of the node is in a destination address of the IPv6 packet, after receiving the packet, the node may decrease the SL by 1, offset the pointer to a new segment, copy a segment identifier (that is, in the IPv6 address format) corresponding to the SL after the SL is decreased by 1 to the DA field, and then forward the packet to a next node. Usually, when the SL field decreases to 0, the node may pop up an SRH packet header, and then perform next processing on the packet. If a node does not support the SR, the node does not need to process SRH information in the IPv6 packet. Instead, the node searches an IPv6 routing table based on an IPv6 destination address field, and normally forwards the IPv6 packet.

An SR policy is a traffic engineering mechanism for the SR. Usually, an SR policy includes: a headend, a color identifier, a destination identifier, and a segment identifier list indicating a forwarding path. The headend identifies a headend that executes the SR policy. The color is used to associate the SR with a service attribute such as a low latency and a high bandwidth, to summarize a service capability of the SR policy. The endpoint identifies a destination address of the SR policy. Usually, one SR policy is determined by using (the headend, the color, or the endpoint). For a same headend, one policy may alternatively be determined by using (the color or the endpoint). The SR policy may include one or more segment identifier lists, to implement functions such as load balancing and multipath backup. When forwarding a packet, the headend may determine, according to the SR policy, a segment identifier list corresponding to the packet, to determine a forwarding path for forwarding the packet, and encapsulate the segment identifier list into the packet to display or disperse an indication path.

A route prefix includes an IP address and a subnet mask. On the IPv6 network, a length of the subnet mask may be 128 bits or less than 128 bits. In an example, the route prefix may be written as A1::1/32 or A1::1/128, where A1::1 is an IP address, and 32 or 128 represents the length of the subnet mask.

A subnet prefix includes an IP address and a subnet mask, and represents a subnet. On the IPv6 network, a length of the subnet mask is less than 128 bits. In an example, the route prefix may be written as A1::1/32 or A1::1/64, where A1::1 is an IP address, and 32 or 64 represents the length of the subnet mask.

A manner in which a user accesses a cloud server is usually to establish an end-to-end connection tunnel between a metropolitan area network in which a terminal of the user or a branch of an enterprise is located and a backbone network in which a cloud service is located, so that the user accesses the cloud server based on the tunnel. However, a large quantity of tunnels or traffic engineering tunnels usually need to be configured to establish the tunnel in this manner.

For example, FIG. 1 is a schematic diagram of a network architecture according to an embodiment of this application. As shown in FIG. 1, a network on the left of FIG. 1 is a metropolitan area network, and a network on the right of FIG. 1 is a backbone network. Services and data of an enterprise user are deployed in a cloud connected to the backbone network. When accessing the cloud, the enterprise user needs to access the data or the services on the cloud from a provider edge (PE) device: a PE 1 or a PE 2 of the metropolitan area network on the left to a cloud PE 1 or a cloud PE 2 on the right. The cloud PE indicates that the device is a PE device that accesses the cloud. In addition, a path from the PE 1 or the PE 2 to the cloud PE 1 or the cloud PE 2 further includes intermediate network devices such as a network device A and a network device B in FIG. 1. When the enterprise user has a network quality requirement for accessing the cloud, for example, where a requirement of some services is a low latency and a requirement of some services is a high bandwidth, a path between the PE in the metropolitan area network and the cloud PE needs to be planned based on the network quality requirement.

Currently, because these services have a transmission quality requirement on a network, the path between the PE and the cloud PE is usually planned based on a service requirement and a network topology between the PE and the cloud PE, and end-to-end traffic engineering is configured. When a scale of the network is large, or the network bears a plurality of different service requirements, configurations are complex.

In view of this, an embodiment of this application provides a route advertisement method. A network device advertises a route prefix obtained by the network device, so that after obtaining a route, the network device may determine, based on a longest match between an address related to the route and a subnet prefix, a traffic engineering tunnel that matches a packet. This reduces configuration workloads.

Figure 2:
FIG. 2 is a schematic flowchart of a route advertisement method 200 according to an embodiment of this application.

FIG. 2 is a schematic flowchart of a route advertisement method 200 according to an embodiment of this application. As shown in FIG. 2, the route advertisement method 200 includes the following steps.

Step 201: A first network device obtains a first route, where the first route includes a first route prefix.

The first network device may obtain the first route by receiving a related configuration, or by receiving the first route advertised by a second network device.

The network device may introduce any route into one or more network slices, and issue the route according to the IGP protocol. The issued route may carry an identifier of one or more network slices, or the route may carry a list of a correspondence between one or more network slices and a path identifier. The d route may be a route of a network device outside a network slice range. In this way, the network slice may be traversed by using a route prefix corresponding to the introduced route. The introduced route may alternatively be an interface address of a network device in an IGP domain. In this way, traffic for accessing the interface address may also be forwarded in the domain based on the network slice.

The first network device may be, for example, a physical device such as a router, a switch, or a gateway, or may be a virtual device that supports route issuing and packet forwarding. Specific types of the first network device and the second network device are not limited in this embodiment. For example, when the data processing method 200 is applied to the scenario shown in FIG. 1, the first network device may be, for example, the PE device located in the metropolitan area network shown in FIG. 1, or the network device A located in the backbone network shown in FIG. 1.

In a possible example, the first route obtained by the first network device may be delivered by the second network device to the first network device. The second network device may be, for example, a controller or another path computation device, or may be preconfigured in the first network device.

Step 202: The first network device advertises a second route, where the second route includes a subnet prefix and a path identifier, and a range of the subnet prefix includes a range of the first route prefix.

An explanation that a range of the subnet prefix includes a range of the first route prefix includes but is not limited to the following two possible cases:

1. The subnet prefix is the same as the first route prefix. To be specific, after obtaining the first route, the first network device may issue the first subnet prefix as the route prefix.

2. The range of the subnet prefix is larger than the range of the first route prefix. Usually, when a subnet mask length of the subnet prefix is less than a subnet mask length of the first route prefix, and high-order parts of IP address parts of the subnet prefix and the first route prefix are the same, it is considered that the range of the subnet prefix is larger than the range of the first route prefix. In an example, if a subnet prefix is, for example, A1:1::/32, a first route prefix is, for example, A1:1:1:1::/64, a length of a subnet mask: 32 is less than 64, and high-order parts of IP addresses of the subnet prefix and the first route prefix, for example, A1:1 parts are the same, it is considered that a range of the subnet prefix is larger than a range of the first route prefix. Similarly, when there is a same part between high-order parts of a specific IP address and an IP address of a subnet prefix, it may be considered that a range of the subnet prefix includes the IP address. For example, when the IP address is A1:1: 1:1:1, and the subnet prefix is A1:1::1/32 or A1:1:1:1::2/64, it may be considered that ranges of the two subnet prefixes include an IP address A1:1:1::1.

After obtaining a plurality of routes, the first network device may aggregate route prefixes in the plurality of routes to obtain the subnet prefix, and flood, in a routing form, the subnet prefix in an IGP domain in which the first network device is located.

Optionally, the route issued by the first network device further includes a path identifier, and the path identifier may indicate another network device to determine a forwarding path to the first network device. The path identifier includes a segment identifier or a network slice identifier of the first network device. The first network device may obtain the segment identifier or the network slice identifier in advance. The first network device may alternatively obtain a segment identifier based on a traffic engineering tunnel or a second subnet prefix, and issue the segment identifier by using a first routing packet. The network slice identifier may be, for example, a flexible algorithm identifier (FlexAlgo ID) or another identifier capable of identifying a network slice.

The second route may further include a mapping relationship between an SID and the network slice identifier, so that a network device that receives the path identifier may determine the corresponding network slice identifier or SID based on the mapping relationship.

The path identifier may indicate another network device to determine the forwarding path to the first network device. In addition, the path identifier corresponds to the traffic engineering tunnel. To be specific, the forwarding path determined based on the path identifier and a path indicated by the traffic engineering tunnel meet a same service requirement, for example, both meet a low-latency service requirement or both meet a high-bandwidth service requirement.

The scenario shown in FIG. 1 is used as an example. The first network device in the method 200 may be the PE 1 in FIG. 1, and the third network device in the method 200 may be the cloud PE 1 in FIG. 1.

For ease of understanding, the following describes, with reference to a specific scenario, an example in which the route advertisement method 200 provided in this embodiment is applied to the data processing method.

The first network device may be further configured to forward the packet based on the traffic engineering tunnel. The first network device may receive a traffic engineering tunnel delivered by the controller, where a destination identifier of the traffic engineering tunnel is a subnet prefix, and the path indicated by the traffic engineering tunnel includes a path to the network device A. The subnet prefix may be an aggregation network segment, and a range of the aggregation network segment includes a range of addresses of the cloud PEs in the backbone network. In other words, addresses of some or all the cloud PEs in the backbone network are within the range of the aggregation network segment. For example, the subnet prefix may be A1::0/64. When the PE 1 receives a packet destined for the cloud PE 1, in other words, a destination address of the packet is an address of the cloud PE 1, the PE 1 determines, based on a longest match between the destination address of the packet and the subnet prefix, that the packet matches the traffic engineering tunnel, and forwards the packet to the network device A based on the path indicated by the traffic engineering tunnel. Finally, the network device A is configured to forward the packet to the cloud PE 1. Because the destination identifier of the traffic engineering tunnel is the subnet prefix, there may be a longest match between each of destination addresses of packets destined for a plurality of or all cloud PEs in the backbone network and the subnet prefix.

In other words, the PE 1 may forward, to the network device A based on the path indicated by the traffic engineering tunnel, a packet destined for any cloud PE in the backbone network, and finally the network device A is configured to forward the packet to the corresponding cloud PE. In this way, a quantity of traffic engineering tunnels in the network can be effectively reduced, and configuration or management complexity can be avoided.

An example in which the first address is the destination address of the packet is used for description above. During actual application, the first address may alternatively be a next-hop forwarding address determined by the PE 1 based on the packet, such as a segment identifier or a next-hop address. For example, the cloud PE 1 may issue a route to the PE. The route includes a route prefix and a segment identifier (SID). In this way, after receiving a first packet destined for the cloud PE 1, the PE 1 may determine, based on a longest match between a destination address of the first packet and the route prefix of the route, that the packet needs to be forwarded based on the segment identifier, where the segment identifier is the determined next-hop forwarding address; and then determine, based on a longest match between the segment identifier and the subnet prefix of the traffic engineering tunnel, that the packet matches the traffic engineering tunnel, so that the PE 1 may forward the packet based on the traffic engineering tunnel. In an example, the PE 1 may update the first packet. The first packet includes an SRH, and the SRH includes a segment identifier list of the traffic engineering tunnel and the segment identifier issued by the cloud PE 1.

The method 200 may further include: The first network device further obtains a second route, where the second route includes a route prefix and a first address, and the first address includes a next-hop address or a segment identifier SID. The first network device obtains, based on a longest match between the first address carried in the second route and the first subnet prefix, a correspondence between the route prefix and the traffic engineering tunnel, for example, obtains a correspondence between the route prefix and the identifier of the traffic engineering tunnel. In this way, when determining that there is the longest match between the destination address of the first packet and the subnet prefix, the first network device may determine, through table searching, a route prefix corresponding to the subnet prefix in a routing table, to obtain a traffic engineering tunnel used to forward the first packet, and finally forward the first packet based on the tunnel indicated by the traffic engineering tunnel.

Figure 3:
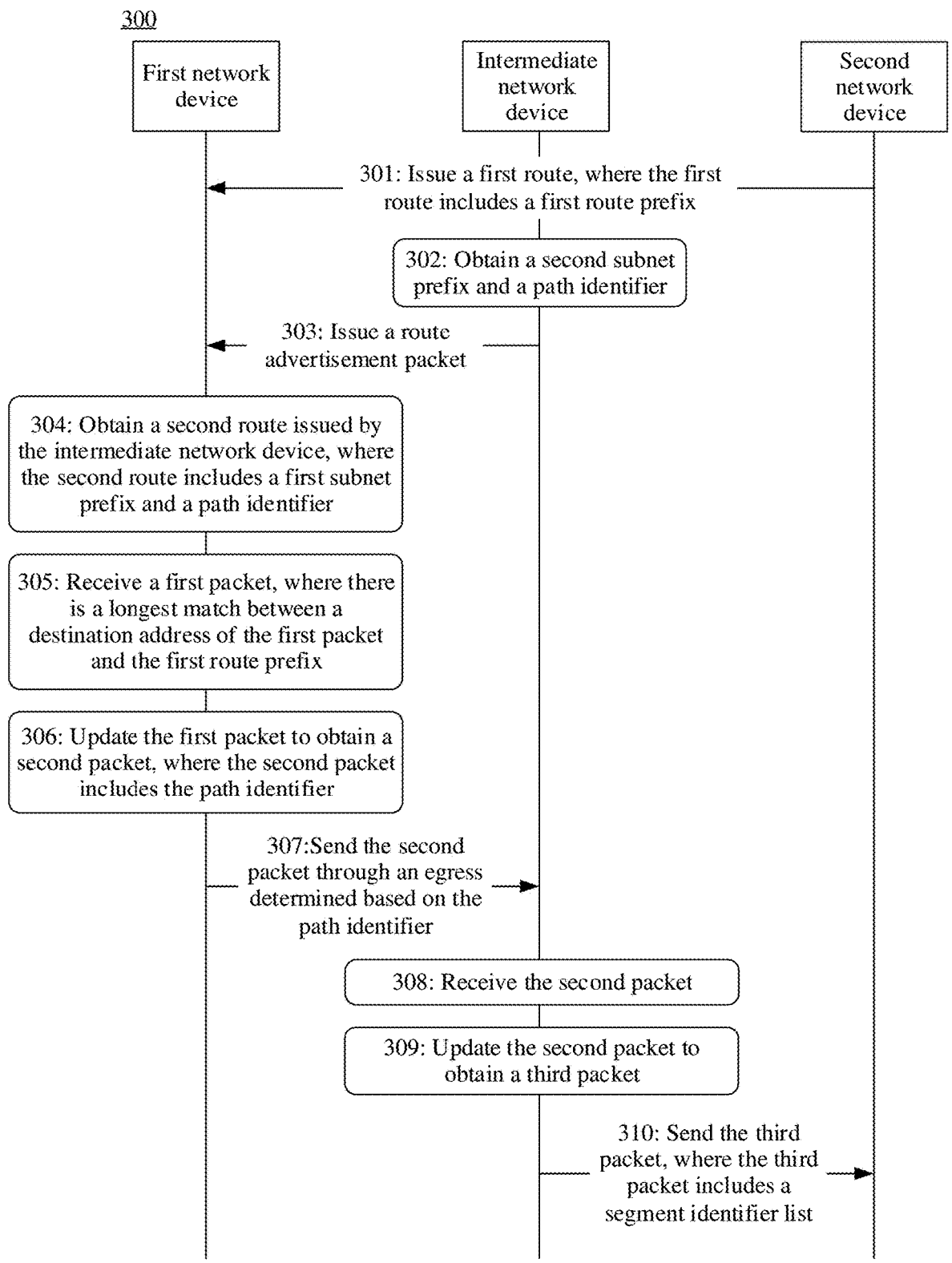
FIG. 3 is a schematic flowchart of a data processing method 300 according to an embodiment of this application.

The following describes, with reference to an example application scenario, a scenario-based method embodiment provided in this application. FIG. 3 is a schematic flowchart of a data processing method 300 according to an embodiment of this application. As shown in FIG. 3, the data processing method 300 includes the following steps.

Step 301: A first network device obtains a first route issued by a second network device, where the first route includes a first route prefix.

The first network device and the second network device may each be, for example, a physical device such as a router, a switch, or a gateway, or may be a virtual device that supports route issuing and packet forwarding. Specific types of the first network device and the second network device are not limited in this embodiment. For example, when the data processing method 300 is applied to the scenario shown in FIG. 1, the first network device may be, for example, the cloud PE device located in the backbone network shown in FIG. 1, and the second network device may be, for example, the PE device located in the metropolitan area network shown in FIG. 1.

A network connection is established between the first network device and the second network device, and one or more network devices are included between the first network device and the second network device. A packet transmitted between the first network device and the second network device needs to pass through the one or more network devices between the first network device and the second network device.

In an example, the first network device and the second network device may be located in different network domains, for example, different IGP domains. The packet may be transmitted in different manners in the network domain in which the first network device is located and the network domain in which the second network device is located. For example, the first network device may be located in a flexible algorithm-based IGP (FlexAlgo) network or an SR network, and the first network device may perform path computation based on a network slice identifier and determine an egress corresponding to the packet, to transmit the packet. The second network device may be located in the SR network. In the network, a forwarding tunnel may be indicated by configuring an SR policy or segment routing traffic engineering (SR TE tunnel). The second network device may transmit the packet based on an indication of a segment identifier list.

In an example scenario, the first network device may be, for example, a provider edge PE device of an access cloud in a backbone network, and the backbone network may be a FlexAlgo network or an SR network. The second network device may be, for example, a PE device based on segment routing in a metropolitan area network. The metropolitan area network may be an SR network configured with traffic engineering, and the traffic engineering includes an SR policy or an SR TE tunnel.

The first network device may obtain the first route in a plurality of manners.

In a possible implementation, the second network device may issue the first route to the first network device by using a route reflector. To be specific, the first network device obtains the first route by receiving routing information sent by the route reflector.

In another possible implementation, the second network device may alternatively issue the first route to the first network device by using a device between the first network device and the second network device. To be specific, the first network device obtains the first route by receiving routing information sent by the device between the first network device and the second network device. The manners in which the first network device obtains the first route are not specifically limited herein.

The first route includes a first route prefix. The first route prefix may be a private network address of the second network device. For example, the first route prefix may be 2.2.2.2/24.

Step 302: The intermediate network device obtains a second subnet prefix and a path identifier, where the second subnet prefix is a destination identifier of a first traffic engineering tunnel, and the first traffic engineering tunnel corresponds to the path identifier.

The intermediate network device is located between the first network device and the second network device. The intermediate network device and the first network device may belong to a same IGP domain, and the intermediate network device may be a border network device in the IGP domain. The intermediate network device may be, for example, a physical device such as a router, a switch, or a gateway, or may be a virtual device that supports route issuing and packet forwarding. A specific type of the intermediate network device is not limited in this embodiment. For example, when the data processing method 300 is applied to the scenario shown in FIG. 1, the intermediate network device may be, for example, a device that is located in the backbone network shown in FIG. 1 and that is connected to the metropolitan area network, and the intermediate network device may be, for example, the network device A located in the backbone network shown in FIG. 1.

The intermediate network device may obtain the second subnet prefix by obtaining a configuration of the traffic engineering tunnel or in another manner. This is not specifically limited in this application.

The first traffic engineering tunnel obtained by the intermediate network device may be sent by a controller or another device to the intermediate network device, or may be preconfigured in the intermediate network device. The first traffic engineering tunnel includes the second subnet prefix and a forwarding path corresponding to the second subnet prefix. The second subnet prefix may be a subnet prefix of the second network device, for example, may be a locator address of the second network device. In this case, the forwarding path corresponding to the second subnet prefix is a forwarding path from the intermediate network device to the second network device.

For example, the controller may send an SR policy to the intermediate network device, and an endpoint of the SR policy is the locator address of the second network device or an address obtained by aggregating loopback addresses. A headend of the SR policy is an address of the intermediate network device, the endpoint is the locator address of the second network device (namely, the second subnet prefix), and a segment identifier list included in the SR policy indicates the forwarding path from the intermediate network device to the second network device.

The path identifier obtained by the intermediate network device in the SR TE tunnel may be used by a network device in a network through which the forwarding path passes, to determine a forwarding path to the intermediate network device. In addition, the path identifier corresponds to the first traffic engineering tunnel. The forwarding path determined based on the path identifier and the forwarding path included in the first traffic engineering tunnel meet a same service requirement, for example, both meet a low-latency service requirement or both meet a high-bandwidth service requirement.

In a possible example, the path identifier includes: a network slice identifier or a second SID included in the intermediate network device.

When the path identifier is the network slice identifier, the intermediate network device may determine the path identifier in a plurality of manners.

Manner 1: When the first traffic engineering tunnel is the SR policy, the intermediate network device may determine the corresponding path identifier based on a correspondence between a color identifier and a path identifier.

For example, there may be a correspondence between a color and a network slice identifier (for example, a FlexAlgo ID) in the intermediate network device of the traffic engineering tunnel. The intermediate network device may determine, based on the correspondence between a color and a network slice identifier, that the SR policy corresponds to the path identifier. The path identifier may be, for example, the network slice identifier. For example, when the color of the SR policy is 123, the intermediate network device may determine, based on a correspondence between a color and a FlexAlgo ID, that the SR policy corresponds to a FlexAlgo 128.

Manner 2: When the first traffic engineering tunnel is the SR policy, the intermediate network device may determine the corresponding path identifier based on a correspondence between a subnet prefix and a path identifier.

For example, when the second network device is located in an SR policy network, the first traffic engineering tunnel may be the SR policy. In a planning process of the SR policy network, a subnet prefix corresponding to a network device is allocated based on a network slice identifier corresponding to the network device. For example, the subnet prefix is allocated based on a network slice identifier corresponding to the service requirement of the low latency. Therefore, a correspondence between a subnet prefix and a network slice identifier may be preconfigured in the intermediate network device. In this way, based on the second subnet prefix and the correspondence, the intermediate network device may determine that the SR policy corresponds to the path identifier. For example, when the subnet prefix of the SR policy is A2:::0/64, the intermediate network device may determine, based on a correspondence between a subnet prefix and a FlexAlgo ID, that the SR policy corresponds to a FlexAlgo 128.

Manner 3: When the first traffic engineering tunnel is the SR TE tunnel, the intermediate network device may determine the corresponding path identifier based on a correspondence between an SR TE tunnel and a path identifier.

For example, when the second network device is located in an SR TE tunnel network, the first traffic engineering tunnel may be the SR TE tunnel. A correspondence between an SR TE tunnel and a network slice identifier may be preconfigured in the intermediate network device. In this way, the intermediate network device may determine, based on the correspondence, that the SR TE tunnel corresponds to the path identifier.

In addition, when the path identifier is the second SID included in the intermediate network device, after determining, in any one of the foregoing three manners, the network slice identifier corresponding to the first traffic engineering tunnel, the intermediate network device may generate a second SID corresponding to the network slice identifier. The second SID may be, for example, an END SID of the intermediate network device. That is, the END SID and a network slice identifier may represent network quality. A network device whose destination identifier and the intermediate network device are in a same IGP domain may forward the packet to the intermediate network device based on the END SID.

Step 303: In response to obtaining the first traffic engineering tunnel and the path identifier, the intermediate network device may issue a route advertisement packet in an IGP domain in which the intermediate network device is located, where the route advertisement packet includes a first subnet prefix and the path identifier, and a range of the first subnet prefix includes a range of the second subnet prefix.

In an example, the first subnet prefix in the route advertisement packet issued by the intermediate network device may be the same as the second subnet prefix that is in the first traffic engineering tunnel and that is received by the intermediate network device. To be specific, the intermediate network device issues a corresponding route advertisement packet based on an obtained traffic engineering tunnel. In another example, the first subnet prefix may alternatively be different from the second subnet prefix. In this case, the range of the first subnet prefix includes the range of the second subnet prefix. To be specific, the intermediate network device generates a new subnet prefix (namely, the second subnet prefix) based on a plurality of subnet prefixes included in a plurality of obtained traffic engineering tunnels, and issues a corresponding route advertisement packet.

The intermediate network device may determine, based on a correspondence, that the first subnet prefix corresponds to the path identifier.

In an example, the correspondence includes a correspondence between the second subnet prefix and the path identifier. The intermediate network device may be statically configured with the correspondence between the subnet prefix and the path identifier, or the controller delivers the correspondence between the subnet prefix and the path identifier to the intermediate network device, and the intermediate network device may determine, based on the correspondence, to obtain the correspondence between the second subnet prefix and the path identifier.

In another example, the first traffic engineering tunnel may be a segment routing policy SR policy, and the SR policy includes a color identifier. The intermediate network device may determine, based on a correspondence including the color identifier and the path identifier, that the first subnet prefix corresponds to the path identifier. The intermediate network device may be statically configured with the correspondence between the color identifier and the path identifier, or the controller delivers the correspondence between the color identifier and the path identifier to the intermediate network device. Therefore, the intermediate network device may determine, based on the color identifier included in the SR policy and the correspondence, that the first subnet prefix corresponds to the path identifier.

For example, before issuing the route advertisement packet, the intermediate network device obtains a second traffic engineering tunnel, where the second traffic engineering tunnel includes a third subnet prefix. The intermediate network device determines that the second traffic engineering tunnel corresponds to the path identifier. The intermediate network device determines the first subnet prefix based on the second subnet prefix and the third subnet prefix, where the range of the first subnet prefix includes the range of the second subnet prefix and a range of the third subnet prefix.

In other words, when the intermediate network device obtains a plurality of traffic engineering tunnels, if the plurality of traffic engineering tunnels correspond to a same path identifier, the intermediate network device may aggregate subnet prefixes in the plurality of traffic engineering tunnels into one subnet prefix, and include the aggregated subnet prefix in the issued route advertisement packet. In this way, for the plurality of traffic engineering tunnels having the same path identifier, the intermediate network device may issue one route advertisement packet only in the IGP domain, to reduce overheads of the advertisement packet. In addition, the plurality of subnet prefixes are aggregated into a subnet prefix of a larger range, so that route management of the first network device can be further reduced, and a quantity of tunnels can be correspondingly reduced.

In another example, when the first traffic engineering tunnel is sent by a border device in a network domain in which the first network device is located to the intermediate network device, the border device may alternatively receive a plurality of traffic engineering tunnels having a same path identifier, and generate the first traffic engineering tunnel based on the plurality of traffic engineering tunnels. In other words, the border device may aggregate subnet prefixes in the plurality of traffic engineering tunnels received by the border device into one subnet prefix, and send the aggregated subnet prefix carried in the first traffic engineering tunnel to the intermediate network device.

In an example, when the path identifier is the second SID included in the intermediate network device, the second route further includes a mapping relationship between the SID and the network slice identifier. In this way, the network device that receives the route advertisement packet may generate a corresponding mapping relationship table based on the mapping relationship, so that when receiving a packet including the SID, the network device can determine a corresponding network slice identifier based on the SID and the mapping relationship table.

Step 304: The first network device obtains a second route issued by the intermediate network device, where the second route includes a first subnet prefix and a path identifier.

After the intermediate network device issues the route advertisement packet in the IGP domain, the first network device may receive the second route including the first subnet prefix and the path identifier, where the second route is, for example, an IGP route. When there is another network device between the first network device and the intermediate network device, for example, the second route may be sent by a neighboring device of the first network device to the first network device based on the route advertisement packet.

In an example, the range of the first subnet prefix includes a range of the first route prefix. To be specific, the first network device performs a longest match operation based on the first route prefix in the first route, to match the first subnet prefix. In this way, the first network device may establish an association relationship between the first route and the second route based on a longest match between the first route prefix and the first subnet prefix.

In another example, the first route received by the first network device further includes a first address, and there is a longest match between the first address and the first subnet prefix. In other words, the first network device may establish an association relationship between the first route and the second route based on a longest match between the first address and the first subnet prefix.

Optionally, the first address may include a next-hop address of the second network device or a first SID. The first SID may indicate a position of the second network device in the network or a network service provided by the second network device. For example, the first SID may be a virtual private network segment identifier VPN SID or another SID that may indicate the position of the second network device. For example, the first SID may be a VPN SID allocated in a locator network segment of the second network device.

It should be noted that, there is no sequence between step 301 and step 304 in this embodiment. Step 301 may be performed before step 304, or step 304 may be performed before step 301, or step 301 and step 304 may be performed simultaneously. This is not specifically limited in this embodiment.

Step 305: The first network device receives a first packet.

In this embodiment, the first packet may be, for example, a service packet that is received by the first network device and that is destined for the second network device.

Step 306: The first network device updates the first packet to obtain a second packet.

In an example, when the range of the first subnet prefix includes a range of the first route prefix, the first network device may determine, based on a longest match between a destination address of the first packet and the first route prefix and a longest match between the first route prefix and the first subnet prefix, that the first packet may be sent based on the path identifier in the second route. The first network device may update the path identifier to the first packet, to obtain a second packet. The path identifier may include, for example, the network slice identifier or the second SID included in the intermediate network device, for example, the END SID.

In another example, when the first route further includes a first address, and there is a longest match between the first address and the first subnet prefix, the first network device may determine, based on the longest match between the destination address of the first packet and the first route prefix, that the first packet may be sent based on the path identifier in the second route. The first network device may update the path identifier to the first packet, to obtain a second packet. In addition, when the first address is the first SID, the first network device may further update the first SID to the first packet to obtain the second packet. That is, the updated second packet includes the first SID and the path identifier.

It should be understood that, when the path identifier is the network slice identifier (for example, the FlexAlgo ID), the path identifier may be carried in a hop-by-hop option header of the second packet.

In an example, after receiving the first route, the first network device may generate a corresponding routing table or forwarding table. The table includes the first route prefix and the first SID. In this way, after obtaining the first packet, the first network device may determine, through table searching, that there is the longest match between the destination address of the first packet and the first route prefix, to determine the first SID corresponding to the first packet, and encapsulate the first SID into the first packet, to obtain the second packet.

In another example, the first network device may obtain, from different tables, the first SID corresponding to the first route prefix, to obtain the second packet.

Step 307: The first network device sends the second packet through an egress, where the egress is determined by the first network device based on the path identifier.

In this embodiment, before sending the second packet through the egress, the first network device may determine, based on the first address in the second packet, the egress for sending the second packet.

The first network device may determine the egress in a plurality of manners.

In an example, the first network device may generate a correspondence between the first address and the path identifier based on a longest match between the first address and the first subnet prefix. Therefore, the first network device may determine the path identifier based on the first address in the second packet and the correspondence. When the path identifier is the network slice identifier, the first network device may obtain, based on the network slice identifier, the egress for sending the second packet. When the path identifier is the second SID included in the intermediate network device, the second route issued by the intermediate network device may further include the mapping relationship between the second SID and the network slice identifier. The first network device may determine the corresponding network slice identifier based on the mapping relationship between the second SID and the second route, and then determine the corresponding egress based on the obtained network slice identifier.

In an example, the first network device may perform path computation in advance based on the network slice identifier, to determine the egress corresponding to the network slice identifier, and store a correspondence between the network slice identifier and an identifier of the egress. In this case, the first network device may obtain the identifier of the egress based on the correspondence between the first subnet prefix and the network slice identifier and the correspondence between the network slice identifier and the egress identifier, and determine the egress.

In another example, when the first network device has obtained the egress corresponding to the network slice identifier, and there is the longest match between the first SID and the first subnet prefix, the first network device generates a correspondence between the first SID and the identifier of the egress. In this way, the first network device may determine the egress of the second packet based on the first SID in the second packet and the correspondence. Step 308: The intermediate network device receives the second packet.

When there is no another network device between the first network device and the intermediate network device, the first network device may send the second packet to the intermediate network device through the egress.

When there is another network device between the first network device and the intermediate network device, because the network device in the IGP domain in which the first network device is located also receives the route advertisement packet sent by the intermediate network device, similarly, after the first network device sends the second packet through the egress, the network device between the first network device and the intermediate network device may forward the second packet based on the path identifier in the second packet, to finally ensure that the intermediate network device may receive the second packet.

Step 309: The intermediate network device updates the second packet to obtain a third packet, where the third packet includes the segment identifier list.

After receiving the second packet, the intermediate network device may determine a corresponding traffic engineering tunnel based on the second packet, so that the intermediate network device can forward the second packet based on the determined traffic engineering tunnel.

The intermediate network device may perform a longest match operation based on the destination address of the second packet, and determine, based on a longest match between the destination address of the second packet and the second subnet prefix included in the traffic engineering tunnel, to forward the second packet based on the traffic engineering tunnel.

In an example, the destination address of the second packet may be the first SID. To be specific, the intermediate network device may perform the longest match operation based on the first SID, and determine, based on the longest match between the first SID and the second subnet prefix included in the traffic engineering tunnel, to forward the second packet based on the traffic engineering tunnel.

In another example, the destination address of the second packet may not be the first SID, that is, the destination address of the second packet is the same as the destination address of the first packet, and the first network device does not update the destination address of the first packet.

It should be understood that, in Manner 2, there may be two cases in which the destination address of the second packet is not the first SID.

Case 1: The range of the first subnet prefix in the second route includes the range of the first route prefix in the first route. In other words, the range of the second subnet prefix in the traffic engineering tunnel includes the range of the first route prefix, and the second subnet prefix may be an aggregation network segment obtained by aggregating a plurality of route prefixes.

Case 2: The first route further includes a first address, the first address is a next-hop address, and there is a longest match between the first address and the first subnet prefix. In other words, the range of the second subnet prefix in the traffic engineering tunnel includes a range of the next-hop address, and the second subnet prefix may be an aggregation network segment obtained by aggregating a plurality of next-hop addresses.

In addition, as described above, the first subnet prefix and the second subnet prefix may be the same or different.

In an example, when the first subnet prefix and the second subnet prefix are the same, the intermediate network device may search, according to a longest match principle, subnet prefixes corresponding to one or more obtained traffic engineering tunnels for a subnet prefix corresponding to the destination address of the second packet or the first SID, until a second subnet prefix with a highest matching degree is found.

In another example, when the first subnet prefix and the second subnet prefix are different, the first subnet prefix may be obtained by aggregating subnet prefixes included in a plurality of traffic engineering tunnels. Similarly, the intermediate network device may search, according to a longest match principle, subnet prefixes corresponding to one or more obtained traffic engineering tunnels for a subnet prefix corresponding to the destination address of the second packet or the first SID, until a second subnet prefix with a highest matching degree is found.

It may be understood that, when searching for a route, a plurality of matching results may be usually obtained, and a route with a longest network prefix is selected from the plurality of matching results. This may be referred to as the longest match principle. A longer network prefix indicates a smaller address block and a more specific route.

When it is determined that there is the longest match between the destination address of the second packet and the first subnet prefix, because the first subnet prefix is included in the first traffic engineering tunnel, the intermediate network device may determine a forwarding path included in the first traffic engineering tunnel. The forwarding path may be, for example, a segment identifier list. In this way, the intermediate network device may update the segment identifier list to the second packet, to obtain a third packet including the segment identifier list. The segment identifier list in the third packet indicates the network device between the second network device and the intermediate network device to forward the third packet, so that the third packet is forwarded to the second network device.

In a possible example, when the first traffic engineering tunnel is the SR policy, the SR policy may include a plurality of candidate paths, and the plurality of candidate paths have different weights, to implement load sharing. The intermediate network device may select a path based on the weights of the plurality of candidate paths in the SR policy, and obtain a segment identifier list corresponding to the path.

Step 310: The intermediate network device sends the third packet.

The intermediate network device may send the third packet based on a destination address of the third packet, where the destination address of the third packet may be the first SID in the segment identifier list included in the third packet. Because the intermediate network device includes the segment identifier list, the third packet can be forwarded to the second network device based on the path indicated by the first traffic engineering tunnel. In this embodiment, the first network device separately obtains the first route issued by the second network device and the second route issued by the intermediate network device, and associates the first route with the second route based on the match between the route prefix or the first address in the first route and the subnet prefix in the second route, so that the first network device can determine the egress based on the path identifier in the second route, and forward a packet destined for the second network device to the intermediate network device, and the intermediate network device is then configured to forward the second packet to the second network device. In this way, a quantity of tunnels or traffic engineering tunnels in the network can be reduced, and configuration or management complexity can be avoided.

For ease of understanding, the following describes, in detail with reference to a specific example, the data processing method provided in embodiments of this application.

Figure 4:
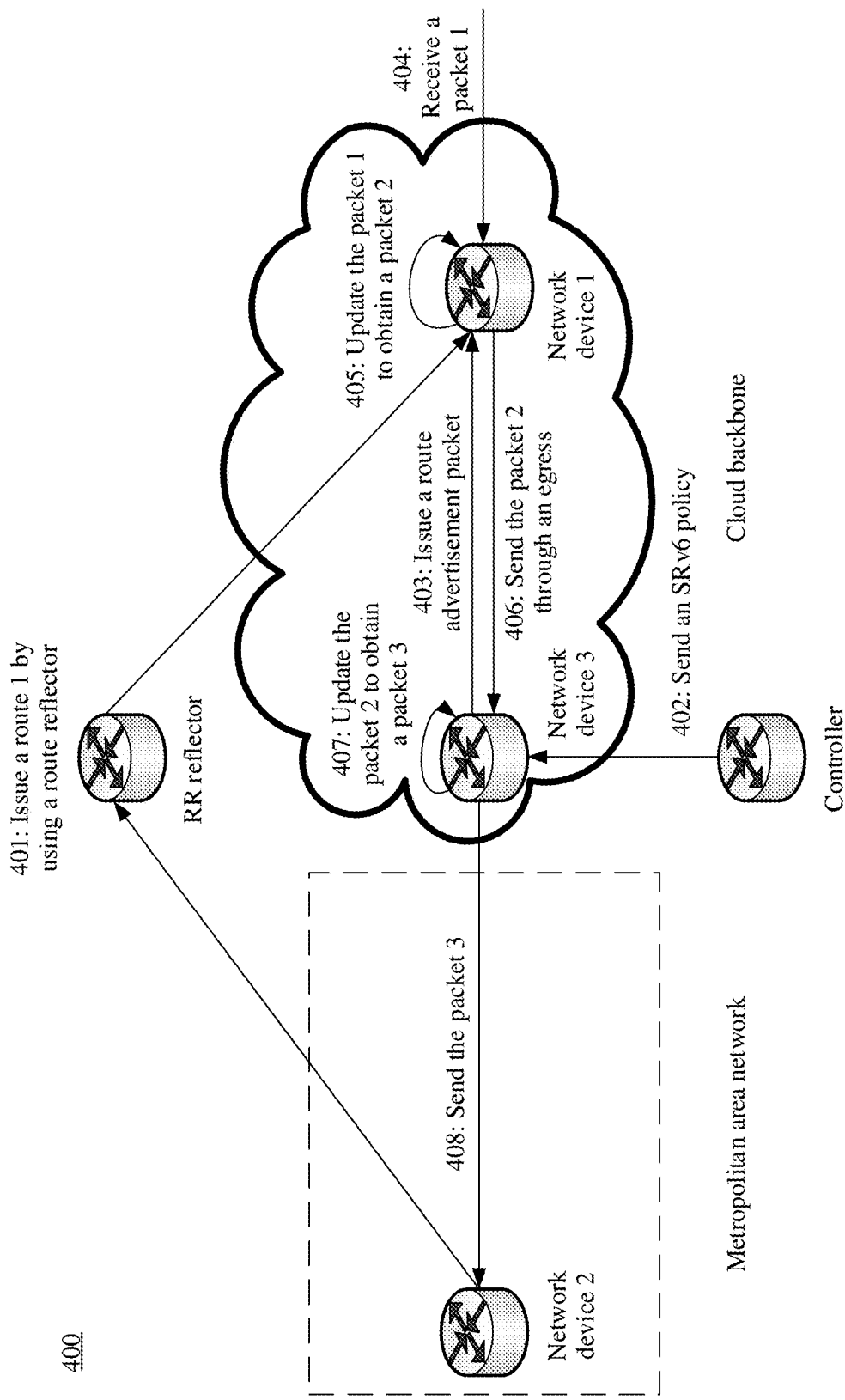
FIG. 4 is a schematic flowchart of a data processing method 400 according to an embodiment of this application.

FIG. 4 is a schematic flowchart of a data processing method 400 according to an embodiment of this application. As shown in FIG. 4, a network architecture in FIG. 4 is similar to the network architecture shown in FIG. 1. For ease of drawing, a network device between a network device 1 and a network device 3 is not shown, and a network device between a network device 2 and the network device 3 is not shown either. A backbone network in which the network device 1 is located may be a FlexAlgo network or an SR network, and a metropolitan area network in which the network device 2 is located may be an SR network configured with traffic engineering. The traffic engineering includes an SR policy or an SR TE tunnel. For ease of description, an example in which the backbone network supports the FlexAlgo network, and the metropolitan area network is configured with an SR policy network is used below, to describe the data processing method 400.

As shown in FIG. 4, the data processing method 400 includes the following steps.

Step 401: The network device 2 issues a route 1 to the network device 1 by using a route reflector.

Case 1: The route 1 includes a route prefix 1, and the route prefix 1 indicates that the route 1 is routing information of a packet whose destination address and the route prefix 1 are in a longest match. For example, the route prefix 1 may be, for example, A1::1/84.

Optionally, the route 1 may further include the following information, as shown in the following two cases:

Case 2: The route 1 further includes a next-hop address, and the route 1 indicates that the packet whose destination address corresponds to the route prefix 1 may be sent by using a device or a service indicated by the next-hop address. The next-hop address may be, for example, a loopback address of the network device 2. For example, the next-hop address may be, for example, B1::1.

Case 3: The route 1 includes the route prefix 1 and an SID, and the route 1 indicates that the packet whose destination address and the route prefix 1 are in the longest match may be sent by using a device or a service indicated by the SID. The SID may be a VPN SID allocated in a locator network segment corresponding to the network device 1. For example, the VPN SID may be C1::1.

It may be understood that, in addition to issuing the route to the network device 1 by using the route reflector, the network device 2 may also issue the route 1 to the network device 1 in another manner, for example, issue the route to the network device 1 by using the network device 3. Details are not described herein again.

Step 402: A controller sends an SR policy to the network device 3.

In this embodiment, the controller may compute a forwarding path from the network device 3 to the network device 2 based on a service requirement, to obtain a corresponding SR policy, and deliver the SR policy obtained through computation to the network device 3. For example, the controller computes the forwarding path from the network device 3 to the network device 2 based on a low-latency requirement, to obtain the SR policy. A headend of the SR policy is an address of the network device 3; and an endpoint is a subnet prefix. The SR policy further includes a segment identifier list, indicating the forwarding path from the network device 3 to the network device 2.

For example, in Case 1 in which the route 1 includes the route prefix 1, a range of the endpoint of the SR policy may include a range of the route prefix 1. For example, the endpoint may be A1::0/64.

In Case 2 in which the route 1 further includes the next-hop address, a range of the endpoint of the SR policy may include a range of the next-hop address. For example, the endpoint may be B1::0/64.

In Case 3 in which the route 1 further includes the SID, a range of the endpoint of the SR policy may include a range of the SID. For example, the endpoint may be C1:::0/64.

The SR policy further includes a color, and the color is associated with a service requirement corresponding to the SR policy. For example, a color 123 may identify that the service requirement corresponding to the SR policy is a low-latency requirement.

In an example, a correspondence between the color and a network slice identifier is preset in the network device 3. To be specific, the network device 3 may determine, based on the color in the SR policy and the correspondence, the network slice identifier corresponding to the SR policy. For example, the color of the SR policy may be, for example, 123. In this case, the network device 3 may determine, based on the correspondence, that the corresponding network slice identifier is a FlexAlgo 128. A path obtained by performing path computation based on the network slice identifier also meets the service requirement corresponding to the SR policy, to be specific, meets the low-latency requirement.

In another example, a correspondence between the color and a network slice identifier is preset in the network device 3. After determining, based on the color in the SR policy and the correspondence, the network slice identifier corresponding to the SR policy, the network device 3 may further allocate a corresponding SID to the network slice identifier. The SID may be, for example, an END SID. In addition, the network device 3 may generate a mapping relationship between the network slice identifier and the SID. For example, a mapping relationship table indicating the mapping relationship between the network slice identifier and the SID may be shown in Table 1:

TABLE i

| FlexAlgo ID | END SID |
|---|---|
| FlexAlgo 128 | B1:1:1:1::1 |
| FlexAlgo 129 | B1:1:1:2::1 |
| FlexAlgo 130 | B1:1:1:3::1 |

Step 403: The network device 3 issues a route advertisement packet, so that the network device 1 receives a route 2.

In response to obtaining the SR policy, an intermediate network device may generate a route advertisement packet, and issue the route advertisement packet in an IGP domain in which the intermediate network device is located.

In an implementation, a route prefix 2 in the route advertisement packet may be the endpoint of the SR policy, for example, may be A1::0/64, B1::0/64, or C1::0/64. The route advertisement packet may further carry a path identifier corresponding to the SR policy, for example, the network slice identifier (for example, FlexAlgo 128) or the SID allocated by the network device 3 based on the network slice identifier. The network slice identifier indicates a network device along a path to perform path computation for the route prefix 2 based on an indication of the network slice identifier, determine a corresponding egress, and forward a packet to the network device 3.

In an example, when the path identifier is the SID allocated by the network device 3 based on the network slice identifier, the route advertisement packet may further include the mapping relationship between the network slice identifier and the SID. The network device that receives the route advertisement packet may generate a corresponding mapping relationship table based on the mapping relationship, so that when receiving a packet including the SID, the network device can determine a corresponding network slice identifier based on the SID and the mapping relationship table.

In another implementation, when the network device 3 receives a plurality of SR policies destined for a network domain in which the network device 2 is located, and these SR policies have a same color, the network device 3 may aggregate endpoints of these SR policies to obtain an aggregation network segment, where a range of the aggregation network segment includes a range of the endpoints of the plurality of SR policies. For example, the aggregation network segment may be A1:::0/48, and the endpoint of the SR policy corresponding to the network device 2 is A1::0/64. Obviously, a range of A1::0/48 includes a range of A1::0/64.

After the network device 3 issues the route advertisement packet in the IGP domain, the network device 1 may receive the corresponding route 2, where the route 2 includes a route prefix 2 and the path identifier. The route prefix 2 may be the endpoint of the SR policy or the aggregation network segment obtained based on the plurality of SR policies.

Step 404: The network device 1 receives a packet 1.

The packet 1 is service traffic destined for the network device 2. To be specific, there is a longest match between a destination address of the packet 1 and a prefix address of a destination route issued by the network device 2. Step 405: The network device 1 updates the packet 1 to obtain a packet 2, where the packet 2 carries the path identifier.

In Case 1 in which the route 1 includes the route prefix 1, the network device 1 may perform a longest match operation based on the destination address of the packet 1, to determine that there is a longest match between the destination address of the packet 1 and the route prefix 2. In this case, the network device 1 updates the path identifier in the route 1 to the packet 1.

In Case 2 in which the route 1 includes the next-hop address, the network device 1 may determine, based on the destination address of the packet 1, that there is a longest match between a next-hop address for forwarding the packet 1 and the route prefix 2. In this case, the network device 1 updates the path identifier in the route 1 to the packet 1.

In Case 3 in which the route 1 includes the SID, the network device 1 may perform a longest match operation based on the destination address of the packet 1, to determine that a next-hop address for forwarding the packet 1 is the SID, where there is a longest match between the SID and the route prefix 2. In this case, the network device 1 updates the path identifier and the SID in the route 1 to the packet 1.

In an example, after receiving the route 1 and the route 2, the network device 1 may establish an association relationship between the next-hop address or the SID and the route 2 based on the longest match between the next-hop address or the SID in the route 1 and the route prefix 2 in the route 2, so that when determining that the next-hop address for forwarding the packet 1 is the next-hop address or the SID, the network device 1 may determine the corresponding route 2 based on the association relationship, to avoid performing the longest match operation again.

The network device 1 may update the packet 1 in two manners.

Manner 1: When the path identifier is a network slice identifier, the network device 1 may encapsulate the network slice identifier in a hop-by-hop header of the packet 1, to obtain the packet 2.

Manner 2: When the path identifier is an SID, the network device 1 may encapsulate the SID in a segment routing header (SRH) extension header of the packet 1, to obtain the packet 2.

Step 406: The network device 1 sends the packet 2 through an egress. The egress is obtained by the network device 1 by performing path computation based on a path identifier corresponding to the packet 2, and the path identifier corresponding to the packet 2 is the path identifier carried in the route 2.

In an example, after receiving the route 2, the network device 1 may perform path computation based on the path identifier in the route 2, to obtain a corresponding egress. In this way, after generating the packet 2 including the path identifier, the network device 1 may determine, based on the egress corresponding to the path identifier in the packet 2, an egress used to send the packet 2.

There may be two manners in which the network device 1 performs path computation based on the path identifier to obtain the egress.

Manner 1: The path identifier is an SID. The route 2 received by the network device 1 includes the SID and the mapping relationship between the SID and the network slice identifier. The network device 1 may determine, based on the SID and the mapping relationship, the network slice identifier corresponding to the SID, and then perform path computation based on the network slice identifier, to obtain the egress corresponding to the SID.

Manner 2: The path identifier is a network slice identifier. The route 2 received by the network device 1 includes the network slice identifier. The network device 1 may perform path computation based on the network slice identifier, to obtain the egress corresponding to the network slice identifier.

Step 407: The network device 3 updates the packet 2 to obtain a packet 3.

Because the network device in the IGP domain in which the network device 1 is located also receives the route advertisement packet sent by the network device 3, similarly, after the network device 1 sends the packet 2 through the egress, the network device between the network device 1 and the network device 3 may also determine, based on the path identifier of the packet 2, the egress for forwarding the packet 2, so that the network device 3 may receive the packet 2.

For example, when the path identifier in the packet 2 is the network slice identifier, the network device between the network device 1 and the network device 3 may perform path computation based on a network slice identifier in a hop-by-hop header of the packet 2, to obtain the egress for forwarding the packet 2. When the path identifier in the packet 2 is the SID, the network device between the network device 1 and the network device 3 may obtain an SID at an outermost layer in an SRH extension header of the packet 2, determine, based on the SID and a mapping relationship between the SID and a network slice identifier, the network slice identifier corresponding to the SID, and then perform path computation based on the network slice identifier, to obtain the egress for forwarding the packet 2.

After receiving the packet 2, the network device 3 may perform the longest match operation based on a destination address of the packet 2, where the destination address of the packet 2 may be or may not be the SID. If the destination address of the packet 2 carries the SID, the network device 3 may perform the longest match operation based on the SID, and determine, based on a longest match between the SID and an endpoint included in a traffic engineering tunnel, for example, a longest match between an SID (C1::1) and an endpoint (C1::0/64) in the traffic engineering tunnel, to forward the packet 2 based on the traffic engineering tunnel.

After determining the traffic engineering tunnel corresponding to the packet 2, the network device 3 may update a segment identifier list in the traffic engineering tunnel to the packet 2, to obtain the packet 3.

Step 408: The network device 3 sends the packet 3.

After obtaining the packet 3 through updating, the network device 3 may forward the packet 3 based on the segment identifier list in the packet 3. In addition, the network device between the network device 3 and the network device 2 may also forward the packet 3 based on the segment identifier list in the packet 3, so that the packet 3 is finally forwarded to the network device 2.

Figure 5A:
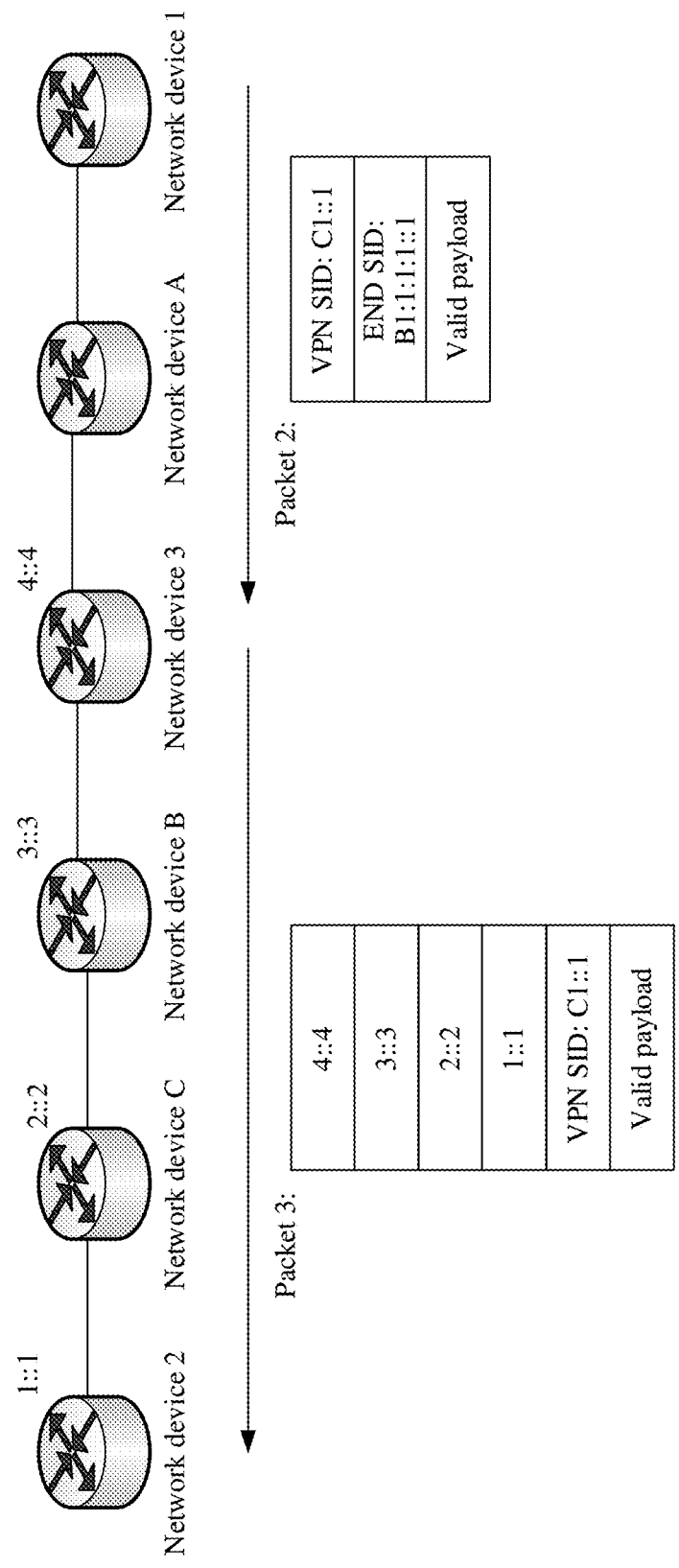
FIG. 5A is a schematic diagram of packet forwarding according to an embodiment of this application.

Specifically, FIG. 5A is a schematic diagram of packet forwarding according to an embodiment of this application. As shown in FIG. 5A, a packet forwarding process described in FIG. 5A is based on the embodiment corresponding to FIG. 4. A network device A is further included between a network device 1 and a network device 2; and a network device B and a network device C are further included between a network device 3 and the network device 2.

A packet 2 sent by the network device 1 includes a VPN SID (C1::1) and an END SID (B1:1:1:1:1). The network device 1 determines an egress of the packet 2 based on the END SID, and sends the packet 2 to the network device A. Similarly, the network device A may determine an egress based on the END SID in the packet 2 and a mapping relationship between an SID and a network slice identifier, and send the packet 2 to the network device 3.

After receiving the packet 2, the network device 3 may determine, based on the VPN SID in the packet 2, an SR policy and a segment identifier list {4::4, 3::3, 2::2, 1::1} corresponding to the SR policy. Segment identifiers corresponding to the network device 3, the network device B, the network device C, and the network device A are respectively 4::4, 3::3, 2::2, and 1::1. Therefore, the network device 3 encapsulates an obtained segment identifier list into the packet 2, to obtain a packet 3 including the segment identifier list. In this way, the network device 2, the network device B, and the network device C may forward the packet 3 to the network device 2 based on an indication of the segment identifier list.

Figure 5B:
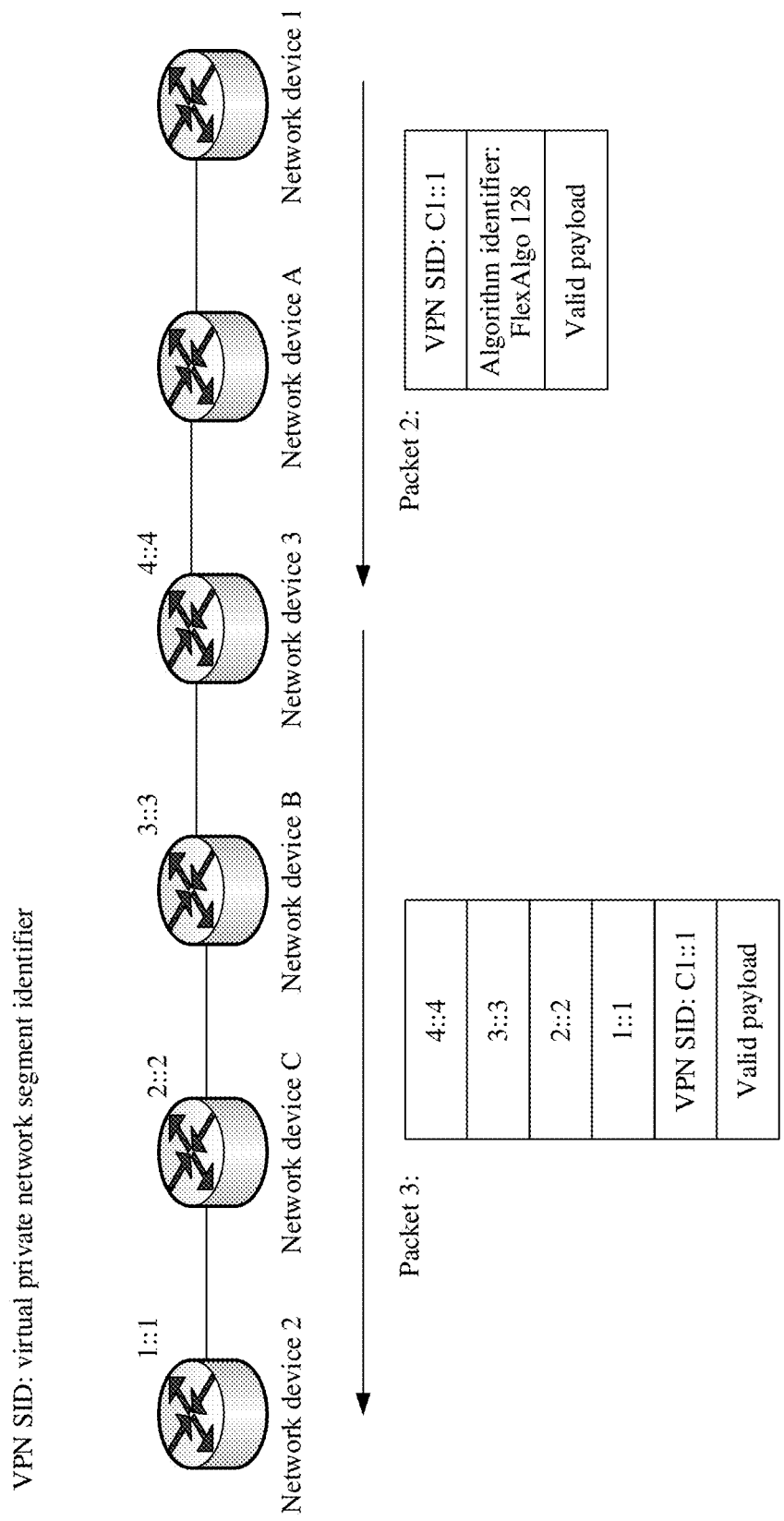
FIG. 5B is a schematic diagram of packet forwarding according to an embodiment of this application.

FIG. 5B is a schematic diagram of another packet forwarding according to an embodiment of this application. As shown in FIG. 5B, a packet forwarding process described in FIG. 5B is also based on the embodiment corresponding to FIG. 4. In the packet 2 sent by the network device 1, the packet 2 includes a VPN SID (C1::1) and a network slice identifier (FlexAlgo 128). The network device 1 determines the egress of the packet 2 based on the network slice identifier, and sends the packet 2 to a network device A. Similarly, the network device A may determine the egress based on the network slice identifier in the packet 2, and send the packet 2 to the network device 3.

The foregoing describes the process of forwarding the packet from a FlexAlgo network to an SR network. The following describes a process of forwarding a packet from the SR network to the FlexAlgo network. It should be understood that, regardless of the FlexAlgo network described in the foregoing several embodiments or the FlexAlgo network described herein, SR may also be run, and the network and the foregoing SR network are mainly different IGP domains.

Figure 6:
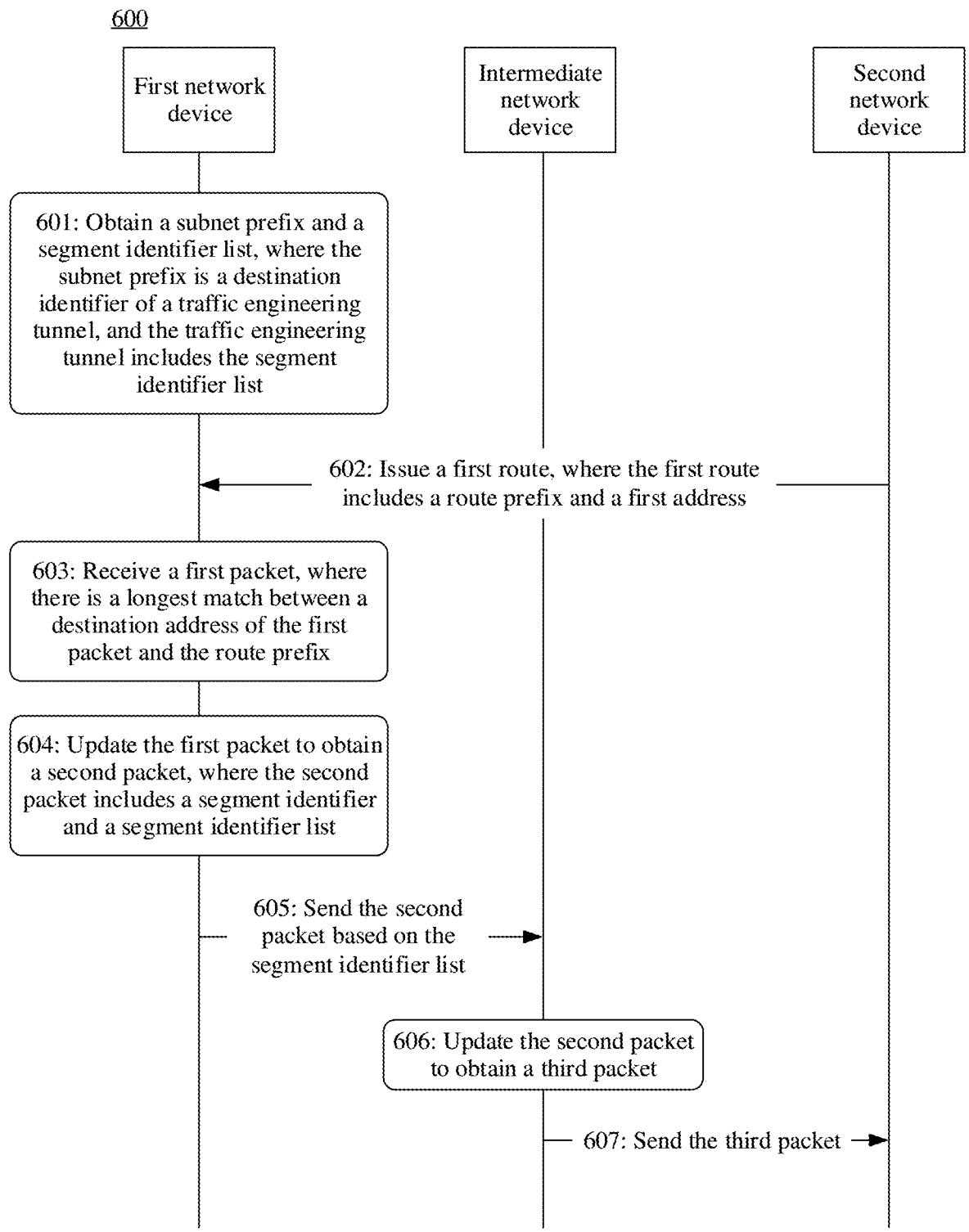
FIG. 6 is a schematic flowchart of a data processing method 600 according to an embodiment of this application.

FIG. 6 is a schematic flowchart of a data processing method 600 according to an embodiment of this application. As shown in FIG. 6, the data processing method 600 includes the following steps.

Step 601: A first network device obtains a subnet prefix and a segment identifier list, where the subnet prefix is a destination identifier of a traffic engineering tunnel, and the traffic engineering tunnel includes the segment identifier list.

The first network device may be, for example, a physical device such as a router, a switch, or a gateway, or may be a virtual device that supports route issuing and packet forwarding. For example, when the data processing method 600 is applied to the scenario shown in FIG. 1, the first network device may be, for example, the PE device located in the metropolitan area network shown in FIG. 1, a metropolitan area network in which the first network device is located may be an SR network configured with traffic engineering, and the traffic engineering includes an SR policy or an SR TE tunnel.

The traffic engineering tunnel obtained by the first network device may be sent by a controller or another device to an intermediate network device, or may be preconfigured in an intermediate network device. The traffic engineering tunnel includes a subnet prefix and the segment identifier list. The subnet prefix may be an address of a second network device, for example, a loopback address of the second network device. The segment identifier list indicates a forwarding path from the first network device to the intermediate network device, and the intermediate network device is located between the first network device and the second network device. The segment identifier list may include one or more segment identifiers.

Step 602: The first network device obtains a first route related to a second network device, where the first route includes a route prefix and a first address, and there is a longest match between the first address and the subnet prefix.

The second network device may be, for example, a physical device such as a router, a switch, or a gateway, or may be a virtual device that supports route issuing and packet forwarding. For example, when the data processing method 600 is applied to the scenario shown in FIG. 1, the second network device may be, for example, the cloud PE device located in the backbone network shown in FIG. 1, and the backbone network in which the second network device is located may be a FlexAlgo network or an SR network.

In this embodiment, a network connection is established between the first network device and the second network device, and one or more network devices are included between the first network device and the second network device. A packet transmitted between the first network device and the second network device needs to pass through the one or more network devices between the first network device and the second network device.

The second network device in the backbone network may issue the first route to the first network device by using a route reflector or another network device between the second network device and the first network device.

In an example, the first route obtained by the first network device may be the route issued by the second network device, or the first route may be a route generated after the first network device receives the route issued by the second network device.

The route prefix in the first route indicates address information of the second network device, and the route prefix may be, for example, D1::1.

In an example, the first address in the first route may include a next-hop address of the network device or an SID of the second network device, and the next-hop address may be, for example, the loopback address of the second network device. The SID of the second network device may indicate a position of the second network device in the network or a network service provided by the second network device, for example, a VPN SID or another SID that may indicate the position of the second network device.

In a possible example, after receiving the first route and the traffic engineering tunnel, the first network device may perform route iteration, in other words, match a traffic engineering tunnel corresponding to the first route.

For example, the first network device may determine, based on the first address in the first route, a subnet prefix that is in the traffic engineering tunnel and that matches the first address. When determining that there is a longest match between the first address of the first route and the subnet prefix of the traffic engineering tunnel, the first network device may generate a correspondence between the route prefix in the first route and the segment identifier list in the traffic engineering tunnel.

When the traffic engineering tunnel is the SR policy, the subnet prefix may be an endpoint of the SR policy, and the SR policy further includes a color. The color is associated with a service requirement, and may indicate that the SR policy is obtained through computation based on the service requirement such as a low latency or a high bandwidth. The first route further includes a path identifier, and the path identifier may be, for example, the color. It may be understood that, when the SID of the second network device is configured, a path identifier corresponding to the second network device may be determined based on a service requirement corresponding to the second network device, and an SID corresponding to the path identifier is configured for the second network device, that is, a correspondence between the SID and the path identifier is established, so that all paths computed by another network device for the SID meet a requirement of the path identifier.

In this case, in addition to determining whether the first address of the first route matches the subnet prefix of the SR policy, the first network device may further determine whether the path identifier in the first route matches the color included in the SR policy. When determining that the path identifier matches the color included in the SR policy, the first network device determines that the first route corresponds to the SR policy, to generate a correspondence between the route prefix in the first route and the segment identifier list in the SR policy.

For example, when the path identifier is the color, the first network device may determine, by comparing whether the color in the first route is the same as the color included in the SR policy, whether the two are matched.

In addition, the first network device may alternatively be statically configured with a correspondence between the path identifier and the subnet prefix. To be specific, the first network device may determine the corresponding path identifier based on the correspondence and the subnet prefix in the traffic engineering tunnel. The path identifier may be, for example, an algorithm identifier. In this way, when sending a packet based on the traffic engineering tunnel, the first network device may include the algorithm identifier corresponding to the traffic engineering tunnel in the packet.

In this embodiment, the subnet prefix in the traffic engineering tunnel may be an aggregation network segment of a network domain in which the second network device is located. In other words, addresses of all network devices in the network domain in which the second network device is located are within a range of the subnet prefix. In other words, for any network device in the network domain in which the second network device is located, a next-hop address in a route issued by the network device may match the subnet prefix, and the traffic engineering tunnel may match routes issued by a plurality of network devices. For example, the subnet prefix in the traffic engineering tunnel may be D1::0/64, a next-hop address in the first route issued by the second network device is D1::10, a next-hop address in a second route issued by another network device in the network domain in which the second network device is located is D1::20, and D1::10 and D1::20 are within a range of D1::0/64.

In a possible example, when the traffic engineering tunnel is the SR policy, the color included in the SR policy may be allocated based on an area and a service requirement, and the endpoint of the SR policy is 0::0. For example, when the color included in the SR policy received by the first network device is configured as 123, the colors whose value is 123 may be allocated to all network devices whose service requirement is the low-latency in the network domain in which the second network device is located. In this way, next-hop addresses carried in routes issued by these network devices certainly can match the endpoint of the SR policy, and the colors carried in the routes can also match the color included in the SR policy. In this way, the routes issued by these network devices can match the SR policy.

Step 603: The first network device receives a first packet, where there is a longest match between a destination address of the first packet and the route prefix.

In this embodiment, the first packet may be, for example, service traffic that is received by the first network device and that is destined for the second network device. To be specific, the destination address of the first packet is a destination address of the second network device. Therefore, there is a longest match between the destination address of the first packet and the route prefix in the first route issued by the second network device.

Step 604: The first network device updates the first packet to obtain a second packet.

In an example, based on the longest match between the destination address of the first packet and the route prefix, the first network device may determine, based on the foregoing correspondence, a segment identifier list and an SID that correspond to the first packet, and add the segment identifier list and the SID to the first packet, to obtain the second packet.

Step 605: The first network device sends the second packet.

Because the segment identifier list indicates the path from the first network device to the intermediate network device, both the first network device and a network device between the first network device and the intermediate network device may send the second packet based on the segment identifier list in the second packet, to forward the second packet to the intermediate network device.

Step 606: The intermediate network device updates the second packet to obtain a third packet.

After receiving the second packet, the intermediate network device may identify, based on the segment identifier list in the second packet, that the intermediate network device is a last network device indicated in the segment identifier list. In this case, the intermediate network device may decapsulate the segment identifier list in the second packet to obtain the third packet, where the third packet further includes the foregoing segment identifier.

Step 607: The intermediate network device forwards the third packet to the second network device.

In this embodiment, the second network device and the intermediate network device may be located in a same IGP domain, and the second network device may issue, in advance in the IGP domain, a route carrying the SID. In addition, each network device in the IGP domain is configured with a correspondence between the SID and the network slice identifier. In this way, the network device in the IGP domain may perform path computation based on the network slice identifier corresponding to the SID, and obtain a corresponding egress. Specifically, a manner in which the network device in the IGP domain determines the egress is similar to that in step 307. Details are not described herein again.

In other words, both the intermediate network device and a network device between the second network device and the intermediate network device may determine the corresponding egress based on the SID, send the third packet, and finally forward the third packet to the second network device.

For ease of understanding, the following describes, in detail with reference to a specific example, the data processing method provided in embodiments of this application.

Figure 7:
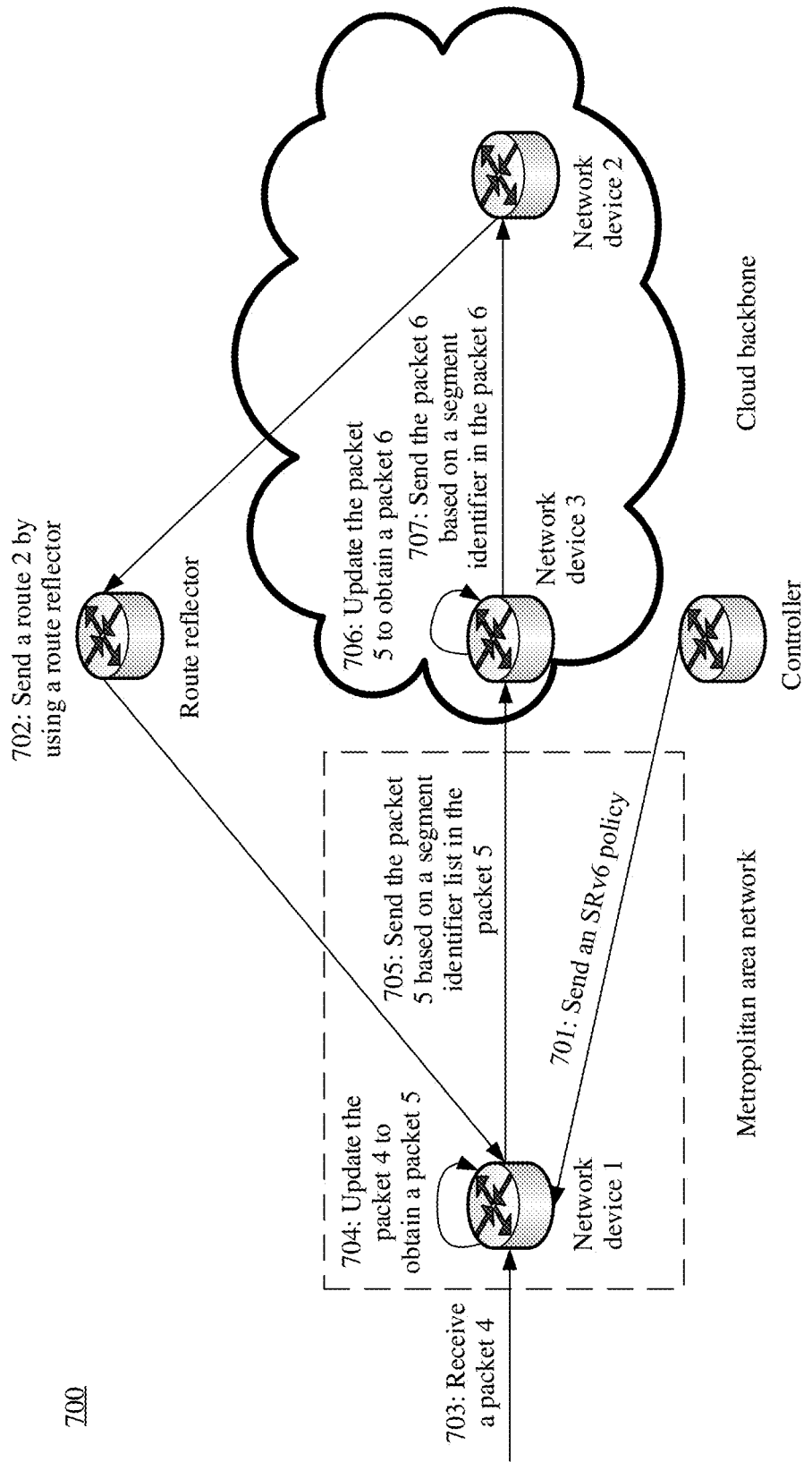
FIG. 7 is a schematic flowchart of a data processing method 700 according to an embodiment of this application.

FIG. 7 is a schematic flowchart of a data processing method 600 according to an embodiment of this application. As shown in FIG. 7, a network architecture in FIG. 7 is similar to the network architecture shown in FIG. 1. For ease of drawing, a network device between a network device 1 and a network device 3 is not shown, and a network device between a network device 2 and the network device 3 is not shown either. A metropolitan area network in which the network device 1 is located may be an SR network configured with traffic engineering, and the traffic engineering includes an SR policy or an SR TE tunnel. A backbone network in which the network device 2 is located may be a FlexAlgo network or an SR network. For ease of description, an example in which the backbone network supports the FlexAlgo network, and the metropolitan area network is configured with an SR policy network is used below, to describe the data processing method 700.

Step 701: A controller sends an SR policy to the network device 1.

In this embodiment, the controller may compute one or more paths from the network device 1 to the network device 3 based on a service requirement of the network device 1, to obtain the SR policy. A headend of the SR policy may be an address of the network device 1, and an endpoint may be an aggregation network segment of a network domain in which the network device 2 is located. A range of the aggregation network segment includes a range of an address of the network device 2. For example, the address of the network device 2 may be D1::10, and the endpoint of the SR policy may be D1::0/64. A color of the SR policy corresponds to the service requirement of the network device 1. For example, when the service requirement of the network device 1 is a low latency, a value of the color may be 123 indicating the low latency. The SR policy further includes a segment identifier list, and a path corresponding to the SR policy may be represented by using the segment identifier list.

Step 702: The network device 2 sends a route 2 to the network device 1 by using a route reflector.

The route 2 includes a route prefix and a first address, and the first address may include a next-hop address or an SID. The network device 2 sends the route 2 by using the route reflector, and the route reflector does not change the next-hop address in the route. Therefore, the next-hop address in the route 2 is a next-hop address of the network device 2, for example, may be D1::10. The SID in the route 2 may be a VPN SID, and indicates position information of the second network device in an SR FlexAlgo network. For example, the SID may be D1::1.

After obtaining the route 2, the network device 1 performs route iteration, in other words, associates the route 2 with the SR policy. Specifically, the network device 1 matches the endpoint of the SR policy in a longest mask matching manner based on the first address in the route 2. When the next-hop address of the route 2 successfully matches the endpoint of the SR policy, the network device 1 may associate the route 2 with the SR policy.

In addition, the route 2 may further carry a color. In this case, when performing route iteration, the network device 1 further needs to match the color of the route 2 in addition to the next-hop address of the route 2. In other words, when the network device 1 determines that the next-hop address of the route 2 successfully matches the endpoint of the SR policy, and the color of the route 2 also successfully matches the color of the SR policy, the network device 1 may associate the route 2 with the SR policy.

Step 703: The network device 1 receives a packet 4.

The packet 4 may be a packet destined for the network device 2. To be specific, a destination address of the packet 4 is a destination address of the network device 2, and the network device 1 may determine, based on a match between the destination address of the packet 4 and the route prefix in the route 2, that the packet 4 may match the route 2.

Step 704: The network device 1 updates the packet 4 to obtain a packet 5.

After receiving the route 2, the network device 1 associates the route 2 with the SR policy. Therefore, when determining that the packet 4 matches the route 2, the network device 1 may update the packet 4 based on the route 2 and the SR policy. Specifically, the network device 1 may encapsulate the SID in the route 2 and the segment identifier list included in the SR policy into the packet 4, to obtain the packet 5.

Step 705: The network device 1 sends the packet 5 based on the segment identifier list in the packet 5.

After obtaining the packet 5, the network device 1 may send the packet 5 based on a path indicated by the segment identifier list in the packet 5. Because the segment identifier list in the packet 5 indicates the path from the network device 1 to the network device 3, in the SR policy network, the network device between the network device 1 and the network device 3 may forward the packet 5 to the network device 3 based on the segment identifier list in the packet 5.

Step 706: The network device 3 updates the packet 5 to obtain a packet 6.

If determining, based on the path indicated by the segment identifier list in the packet 5, that the network device 3 is a last network device in the path, the network device decapsulates the segment identifier list in the packet 5, to obtain the packet 6 including the segment identifier.

Step 707: The network device 3 sends the packet 6 based on the SID in the packet 6.

In this embodiment, the network device 3 and the network device 2 may be located in a same IGP domain, and the network device 2 may issue, in advance in the IGP domain, a route carrying the SID. In addition, each network device in the IGP domain is configured with a correspondence between the SID and the network slice identifier. In this way, the network device in the IGP domain may perform path computation based on the network slice identifier corresponding to the SID, and obtain a corresponding egress. Specifically, a manner in which the network device in the IGP domain determines the egress is similar to that in step 207. Details are not described herein again.

In this way, after receiving the packet 5, the network device 3 may detect the SID in the packet 5, determine, based on the SID, an egress for sending the packet 5, and send the packet 5 through the egress. Alternatively, the network device between the network device 3 and the network device 2 may determine a corresponding egress based on the SID in the packet 5, and forward the packet 5, to finally forward the packet 5 to the network device 2.

Figure 8:
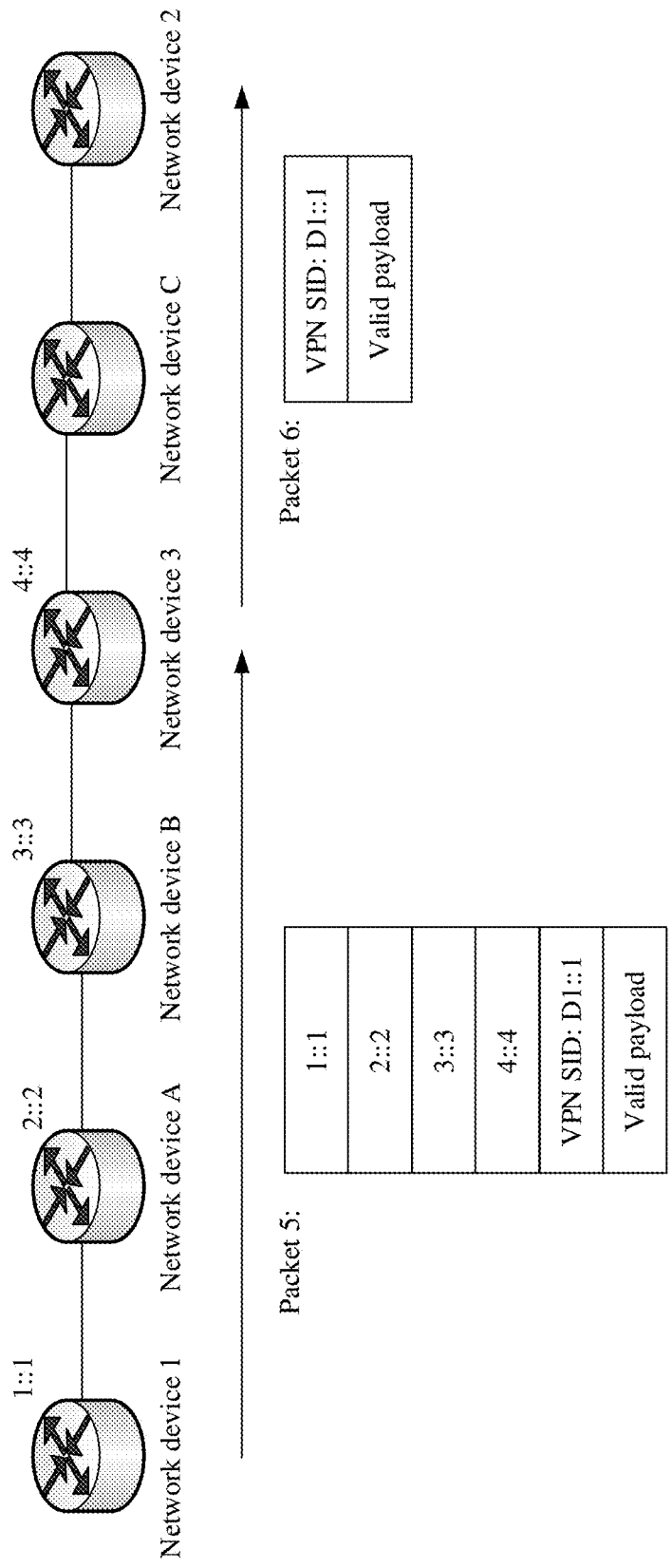
FIG. 8 is a schematic diagram of another packet forwarding according to an embodiment of this application.

Specifically, FIG. 8 is a schematic diagram of another packet forwarding according to an embodiment of this application. As shown in FIG. 8, a packet forwarding process described in FIG. 8 is based on the embodiment corresponding to FIG. 7. A network device A and a network device B are further included between the network device 1 and the network device 3, and a network device C is further included between the network device 3 and a network device 2.

When the network device 1 sends the packet 5, the packet 5 includes a segment identifier list {::1, 2::2, 3::3, 4::4} and a VPN SID (D1::1) that correspond to the SR policy. Segment identifiers corresponding to the network device 1, the network device A, the network device B, and the network device 3 are respectively 1::1, 2::2, 3::3, and 4::4. Therefore, the network device 1, the network device A, and the network device B may sequentially send the packet 5 based on the segment identifier list, so that the network device 3 can receive the packet 5.

After receiving the packet 5, the network device 3 may determine, based on an indication of the segment identifier list, that the network device 3 is a last network device indicated in the segment identifier list. In addition, the network device may determine, based on the VPN SID in the packet 5, an egress corresponding to a packet 4, and send the packet 5 based on the egress. Similarly, after receiving the packet 5 sent by the network device 3, the network device A may also send the packet 5 based on the VPN SID in the packet 5, to forward the packet 5 to the network device 2.

The method 200, the method 300, the method 400, the method 600, and the method 700 in embodiments of this application are described above. The following describes a network device in embodiments of this application. The following described network device has any function of the first network device, the second network device, or the intermediate network device in the method 200, the method 300, the method 400, the method 600, and the method 700.

Figure 9:
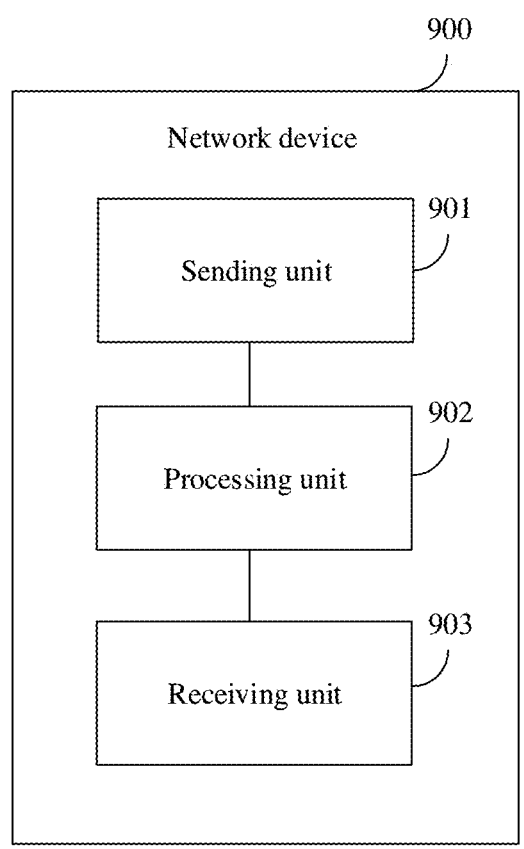
FIG. 9 is a schematic diagram of a structure of a network device 900 according to an embodiment of this application.

FIG. 9 is a schematic diagram of a structure of a network device 900 according to an embodiment of this application. As shown in FIG. 9, the network device 900 includes: a sending unit 001, configured to perform step 301, 303, 307, 310, 410, 402, 403, 406, 408, 602, 605, 607, 701, 702, 705, or 707; a processing unit 902, configured to perform step 302, 304, 305, 308, 404, 601, 603, or 703; and a receiving unit 903, configured to perform step 306, 309, 405, 407, 604, 606, 704, or 706.

The network device 900 may correspond to the first network device, the intermediate network device, or the second network device in the foregoing method embodiments. The units in the network device 900 and the foregoing other operations and/or functions are separately used to implement steps and methods implemented by the first network device, the intermediate network device, or the second network device in the method embodiments. For specific details, refer to the method 200, the method 300, the method 400, the method 600, and the method 700. For brevity, details are not described herein again.

When the network device 900 processes a packet, division of the foregoing functional modules is merely used as an example for description. During actual application, the foregoing functions may be allocated to different functional modules for implementation according to a requirement. That is, an internal structure of the network device 900 is divided into different functional modules, to implement all or some of the functions described above. In addition, the network device 900 provided in the foregoing embodiment belongs to a same concept as the method in the embodiment corresponding to FIG. 1 or FIG. 7. For a specific implementation process thereof, refer to the foregoing method 200, method 300, method 400, method 600, and method 700. Details are not described herein again.

Corresponding to the method embodiment and the virtual apparatus embodiment provided in this application, an embodiment of this application further provides a network device. The following describes a hardware structure of the network device.

A network device 1000 or a network device 1100 described below corresponds to the first network device, the intermediate network device, or the second network device in the foregoing method embodiments, and hardware, modules, and the foregoing other operations and/or functions in the network device 1000 or the network device 1100 are separately used to implement steps and methods implemented by the first network device or the second network device in the method embodiments. For a detailed procedure of how the network device 1000 or the network device 1100 processes a packet and specific details, refer to the foregoing method embodiments. For brevity, details are not described herein again. The steps in the foregoing method 200, method 300, method 400, method 600, and method 700 are completed by using an integrated logical circuit of hardware in a processor of the network device 1000 or the network device 1000, or by using instructions in a form of software. The steps in the methods disclosed with reference to embodiments of this application may be directly performed and completed by a hardware processor, or may be performed and completed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with the hardware of the processor. To avoid repetition, details are not described herein again.

The network device 1000 or the network device 1100 corresponds to the network device 900 in the foregoing virtual apparatus embodiment, and each functional module in the network device 900 is implemented by using software of the network device 1000 or the network device 1100. In other words, the functional modules included in the network device 900 are generated after the processor of the network device 1000 or the network device 1100 reads program code stored in the memory.

Figure 10:
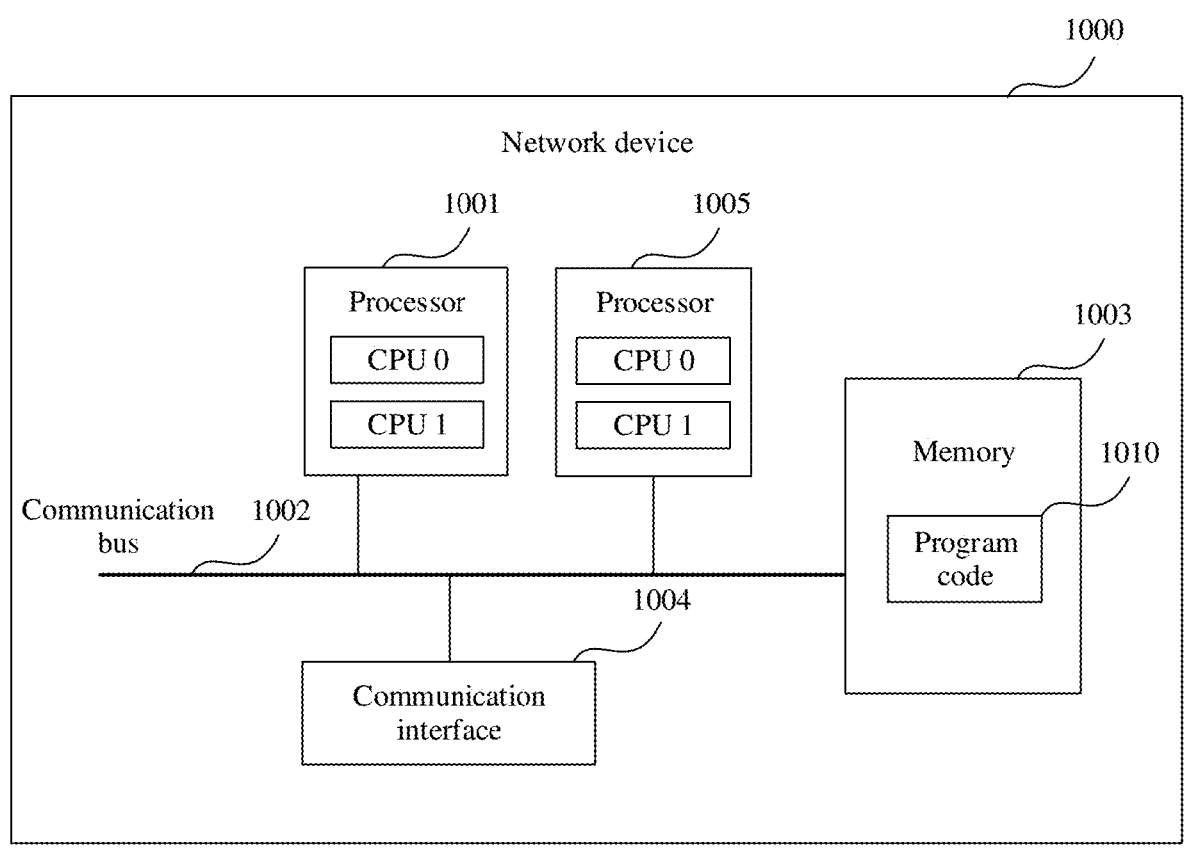
FIG. 10 is a schematic diagram of a structure of a network device 1000 according to an embodiment of this application.

FIG. 10 is a schematic diagram of a structure of a network device 1000 according to an embodiment of this application. The network device 1000 may be configured as a first network device, an intermediate network device, or a second network device. The network device 1000 may be implemented by using a general bus architecture.

The network device 1000 includes at least one processor 1001, a communication bus 1002, a memory 1003, and at least one communication interface 1004.

The processor 1001 may be a general CPU, an NP, a microprocessor, or may be one or more integrated circuits configured to implement the solutions of this application, for example, an application-specific integrated circuit (ASIC), a programmable logic device (PLD), or a combination thereof. The PLD may be a complex programmable logic device (CPLD), a field-programmable logic gate array (FPGA), a generic array logic (GAL), or any combination thereof.

The communication bus 1002 is configured to transmit information between the foregoing components. The communication bus 1002 may be classified into an address bus, a data bus, a control bus, and the like. For ease of representation, only one thick line is used to represent the bus in the figure, but this does not mean that there is only one bus or only one type of bus.

The memory 1003 may be a read-only memory (ROM) or another type of static storage device that can store static information and instructions, or may be a random access memory (RAM) or another type of dynamic storage device that can store information and instructions, or may be an electrically erasable programmable read-only memory (EEPROM), a compact disc read-only memory (CD-ROM) or other compact disc storage, optical disc storage (including a compressed optical disc, a laser disc, an optical disc, a digital versatile optical disc, a blu-ray optical disc, or the like), a magnetic disk storage medium or another magnetic storage device, or any other medium that can be configured to carry or store expected program code in a form of instructions or a data structure and that can be accessed by a computer. The memory is not limited thereto. The memory 1003 may exist independently, and is connected to the processor 1001 by using the communication bus 1002. The memory 1003 may alternatively be integrated with the processor 1001.

The communication interface 1004 is configured to communicate with another device or a communication network by using any transceiver-type apparatus. The communication interface 1004 includes a wired communication interface, and may further include a wireless communication interface. The wired communication interface may be, for example, an Ethernet interface. The Ethernet interface may be an optical interface, an electrical interface, or a combination thereof. The wireless communication interface may be a wireless local area network (WLAN) interface, a cellular network communication interface, a combination thereof, or the like.

During specific implementation, in an embodiment, the processor 1001 may include one or more CPUs, such as a CPU 0 and a CPU 1 shown in FIG. 10.

During specific implementation, in an embodiment, the network device 1000 may include a plurality of processors, such as the processor 1001 and a processor 1005 shown in FIG. 10. Each of the processors may be a single-core processor (single-CPU) or may be a multi-core processor (multi-CPU). The processor herein may refer to one or more devices, circuits, and/or processing cores configured to process data (such as computer program instructions).

During specific implementation, in an embodiment, the network device 1000 may further include an output device 1006 and an input device 1007. The output device 1006 communicates with the processor 1001, and may display information in a plurality of manners. For example, the output device 1006 may be a liquid crystal display (LCD), a light emitting diode (LED) display device, a cathode ray tube (CRT) display device, or a projector. The input device 1007 communicates with the processor 1001, and may receive user input in a plurality of manners. For example, the input device 1007 may be a mouse, a keyboard, a touchscreen device, or a sensing device.

In some embodiments, the memory 1003 is configured to store program code 911 for performing the solutions of this application, and the processor 1001 can execute the program code 911 stored in the memory 1003. That is, the network device 1000 may implement, by using the processor 1001 and the program code 911 in the memory 1003, the method 200, the method 300, the method 500, or the method 600 provided in the method embodiments.

The network device 1000 in this embodiment of this application may correspond to the first network device, the intermediate network device, or the second network device in the foregoing method embodiments. In addition, the processor 1001, the communication interface 1004, and the like in the network device 1000 may implement functions of the first network device, the intermediate network device, or the second network device and/or steps and methods implemented by the first network device, the intermediate network device, or the second network device in the foregoing method embodiments. For brevity, details are not described herein.

The sending unit 901 and the receiving unit 903 in the network device 900 each are equivalent to the communication interface 1004 in the network device 1000. The processing unit 902 in the network device 900 may be equivalent to the processor 1001 in the network device 1000.

Figure 11:
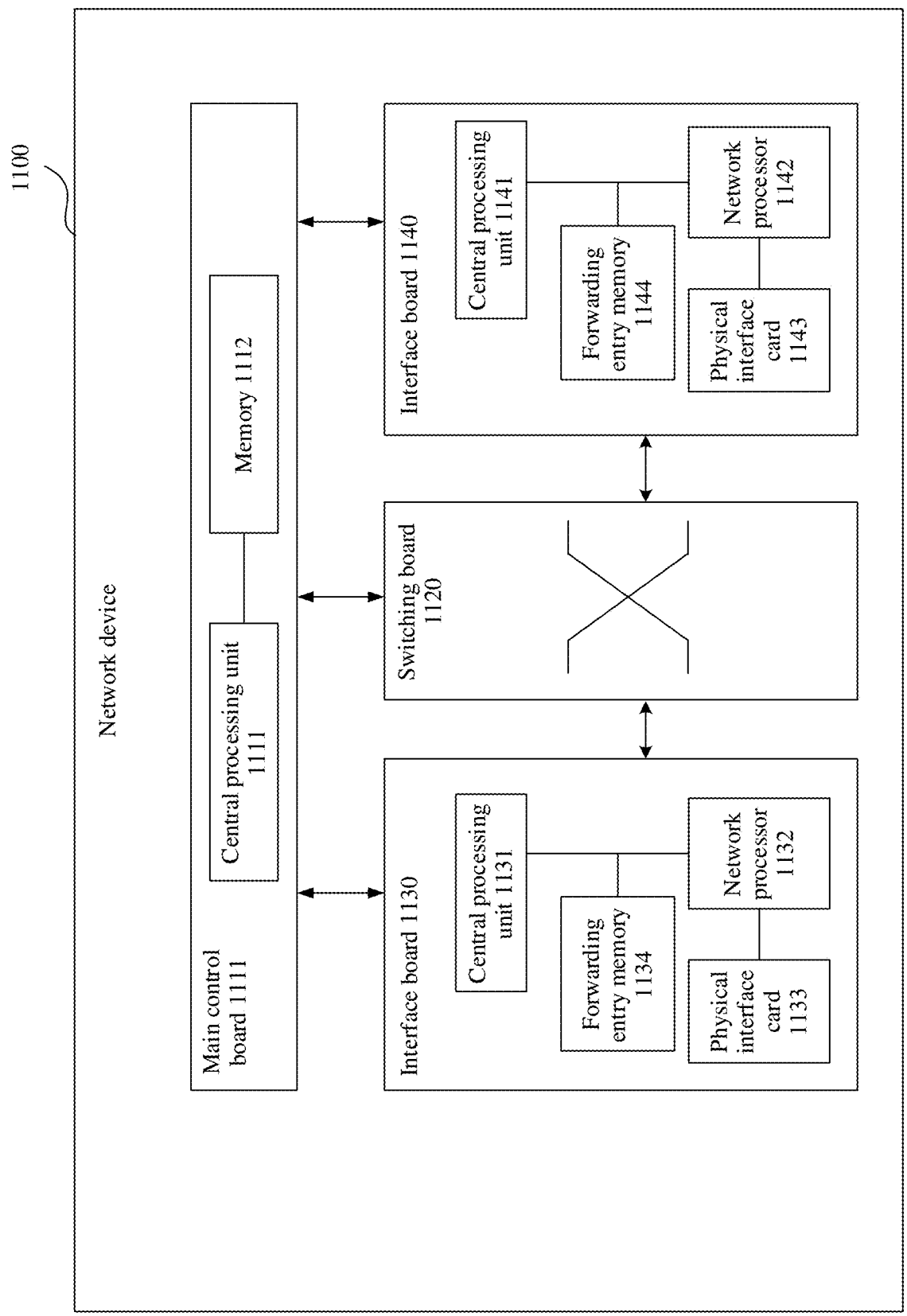
FIG. 11 is a schematic diagram of a structure of a network device 1100 according to an embodiment of this application.

FIG. 11 is a schematic diagram of a structure of a network device 1100 according to an embodiment of this application. The network device 1100 may be configured as the first network device, the intermediate network device, or the second network device in the method 200, the method 300, the method 500, or the method 600. The network device 1100 includes: a main control board 1111 and an interface board 1130.

The main control board 1111 is also referred to as a main processing unit (MPU) or a route processing card (route processor card). The main control board 1111 is configured to control and manage components in the network device 1100, including functions of route computation, device management, device maintenance, and protocol processing.

The main control board 1111 includes: a central processing unit 1111 and a memory 1112.

The interface board 1130 is also referred to as a line processing unit (LPU), a line card, or a service board. The interface board 1130 is configured to provide various service interfaces, and forward a data packet. The service interface includes but is not limited to an Ethernet interface, a POS (Packet over SONET/SDH) interface, and the like. The Ethernet interface is, for example, a flexible Ethernet service interface (FlexE Clients). The interface board 1130 includes: a central processing unit 1131, a network processor 1132, a forwarding entry memory 1134, and a physical interface card (PIC) 1133.

The central processing unit 1131 on the interface board 1130 is configured to control and manage the interface board 1130 and communicate with the central processing unit 1112 on the main control board 1111.

The network processor 1132 is configured to implement packet forwarding processing. A form of the network processor 1132 may be a forwarding chip. Specifically, the network processor 1132 is configured to: forward a received packet based on a forwarding table stored in the forwarding entry memory 1134. If a destination address of the packet is an address of the network device 1100, the network processor sends the packet to a CPU (for example, the central processing unit 1112) for processing. If the destination address of the packet is not the address of the network device 1100, the network processor searches, based on the destination address, the forwarding table for a next hop and an outbound interface corresponding to the destination address, and forwards the packet to the outbound interface corresponding to the destination address. Processing of an uplink packet includes: processing of a packet ingress interface and forwarding table searching. Processing of a downlink packet includes: forwarding table searching, and the like.

The physical interface card 1133 is configured to implement a physical layer interconnection function. Original traffic enters the interface board 1130 from the physical interface card, and a processed packet is sent from the physical interface card 1133. The physical interface card 1133 is also referred to as a subcard and may be installed on the interface board 1130, and is configured to convert an optoelectronic signal into a packet, perform validity check on the packet, and then forward the packet to the network processor 1132 for processing. In some embodiments, the central processing unit may also perform a function of the network processor 1132, for example, implement software forwarding based on a general-purpose CPU. Therefore, the network processor 1132 is not necessary in the physical interface card 1133.

Optionally, the network device 1100 includes a plurality of interface boards. For example, the network device 1100 further includes an interface board 1140. The interface board 1140 includes: a central processing unit 1141, a network processor 1142, a forwarding entry memory 1144, and a physical interface card 1143.

Optionally, the network device 1100 further includes a switching board 1120. The switching board 1120 may also be referred to as a switch fabric unit (SFU). When the network device has a plurality of interface boards 1130, the switching board 1120 is configured to complete data exchange between the interface boards. For example, the interface board 1130 and the interface board 1140 may communicate with each other by using the switching board 1120.

The main control board 1111 is coupled to the interface board 1130. For example, the main control board 1111, the interface board 1130 and the interface board 1140, and the switching board 1120 are connected to a system backboard by using a system bus for interworking. In a possible implementation, an inter-process communication protocol (IPC) channel is established between the main control board 1111 and the interface board 1130, and the main control board 1111 and the interface board 1130 communicate with each other through the IPC channel.

Logically, the network device 1100 includes a control plane and a forwarding plane. The control plane includes the main control board 1111 and the central processing unit 1131. The forwarding plane includes components that perform forwarding, such as the forwarding entry memory 1134, the physical interface card 1133, and the network processor 1132. The control plane performs functions such as routing, generating a forwarding table, processing signaling and a protocol packet, and configuring and maintaining a device status. The control plane delivers the generated forwarding table to the forwarding plane. On the forwarding plane, the network processor 1132 searches the forwarding table delivered by the control plane to forward a packet received by the physical interface card 1133. The forwarding table delivered by the control plane may be stored in the forwarding entry memory 1134. In some embodiments, the control plane and the forwarding plane may be completely separated, and are not on a same device.

If the network device 1100 is configured as the first network device, the network processor 1132 may generate a first packet, and send the first packet from the physical interface card 1133, so that the first packet is transmitted to the second network device.

If the network device 1100 is configured as the second network device, the physical interface card 1133 receives a first packet, and sends the first packet to the network processor 1132. The network processor 1132 obtains, from the first packet, a support status of an iFIT capability of the first network device.

The sending unit 901 and the receiving unit 903 in the network device 900 may each be equivalent to the physical interface card 1133 in the network device 1100. The processing unit 902 in the network device 900 may be equivalent to the network processor 1132 or the central processing unit 1112.

Operations performed on the interface board 1140 are consistent with operations performed on the interface board 1130 in this embodiment of this application. For brevity, details are not described. The network device 1100 in this embodiment may correspond to the first network device, the intermediate network device, or the second network device in the foregoing method embodiments. The main control board 1111, the interface board 1130, and/or the interface board 1140 in the network device 1100 may implement functions of the first network device, the intermediate network device, or the second network device and/or steps implemented by the first network device, the intermediate network device, or the second network device in the foregoing method embodiments. For brevity, details are not described herein again.

It should be noted that, there may be one or more main control boards. When there are a plurality of main control boards, the main control boards may include a primary main control board and a secondary main control board. There may be one or more interface boards, and a network device having a stronger data processing capability provides more interface boards. There may also be one or more physical interface cards on the interface board. There may be no switching board or one or more switching boards. When there are a plurality of switching boards, load balancing and redundancy backup may be implemented together. In a centralized forwarding architecture, the network device may not need the switching board, and the interface board provides a function of processing service data of an entire system. In a distributed forwarding architecture, the network device may have at least one switching board, and data exchange between a plurality of interface boards is implemented by using the switching board, to provide a large-capacity data exchange and processing capability. Therefore, a data access and processing capability of the network device in the distributed architecture is better than that of the device in the centralized architecture. Optionally, the network device may alternatively be in a form in which there is only one card. To be specific, there is no switching board, and functions of the interface board and the main control board are integrated on the card. In this case, the central processing unit on the interface board and the central processing unit on the main control board may be combined into one central processing unit on the card, to perform functions obtained by combining the two central processing units. The device in this form (for example, a network device such as a low-end switch or router) has a weak data exchange and processing capability. A specific architecture that is to be used depends on a specific networking deployment scenario. This is not limited herein.

In some possible embodiments, the first network device, the intermediate network device, or the second network device may be implemented as a virtualized device.

For example, the virtualized device may be a virtual machine (English: Virtual Machine, VM) on which a program having a packet sending function is run, and the virtual machine is deployed on a hardware device (for example, a physical server). The virtual machine is a complete computer system simulated by software, has complete hardware system functions, and runs in an entirely isolated environment. The virtual machine may be configured as the first network device, the intermediate network device, or the second network device. For example, the first network device, the intermediate network device, or the second network device may be implemented based on a general-purpose physical server in combination with a network functions virtualization (Network Functions Virtualization, NFV) technology. The first network device, the intermediate network device, or the second network device is a virtual host, a virtual router, or a virtual switch. After reading this application, with reference to the NFV technology, a person skilled in the art may virtualize, on the general-purpose physical server, the first network device, the intermediate network device, or the second network device that has the foregoing functions. Details are not described herein again.

For example, the virtualized device may be a container, and the container is an entity configured to provide an isolated virtualized environment. For example, the container may be a docker container. The container may be configured as the first network device, the intermediate network device, or the second network device. For example, the first network device, the intermediate network device, or the second network device may be created by using a corresponding image. For example, two container instances, namely, a container instance proxy-container 1 and a container instance proxy-container 2, may be created for a proxy-container by using an image of the proxy-container (the container that provides a proxy service). The container instance proxy-container 1 is provided as the first network device or a first computing device. The container instance proxy-container 2 is provided as the second network device or a second computing device. When a container technology is used for implementation, the first network device, the intermediate network device, or the second network device may run by using a kernel of a physical machine, and a plurality of first network devices, intermediate network devices, or second network devices may share an operating system of the physical machine. Different first network devices, intermediate network devices, or second network devices may be isolated from each other by using the container technology. The containerized first network device, intermediate network device, or second network device may run in a virtualized environment, for example, may run in the virtual machine. Alternatively, the containerized first network device, intermediate network device, or second network device may directly run in the physical machine.

For example, the virtualized device may be a pod. The pod is a basic unit of Kubernetes (Kubernetes is an open-source container orchestration engine of Google, and is briefly referred to as K8s in English) for deploying, managing, and orchestrating a containerized application. The pod may include one or more containers. All containers in a same pod are usually deployed on a same host. Therefore, all the containers in the same pod may communicate with each other through the host, and may share storage resources and network resources of the host. The pod may be configured as the first network device, the intermediate network device, or the second network device. For example, specifically, a container as a service (English full name: container as a service, CaaS for short, a container-based PaaS service) may be indicated to create a pod, and the pod is provided as the first network device, the intermediate network device, or the second network device.

Certainly, the first network device, the intermediate network device, or the second network device may alternatively be another virtualized device, which is not listed one by one herein.

In some possible embodiments, the first network device, the intermediate network device, or the second network device may alternatively be implemented by a general-purpose processor. For example, the general-purpose processor may be in a form of a chip. Specifically, the general-purpose processor that implements the first network device, the intermediate network device, or the second network device includes a processing circuit, and an input interface and an output interface that are internally connected to and communicated with the processing circuit. The processing circuit is configured to perform the packet generation step in the foregoing method embodiments by using the input interface. The processing circuit is configured to perform the receiving step in the foregoing method embodiments by using the input interface. The processing circuit is configured to perform the sending step in the foregoing method embodiments by using the output interface. Optionally, the general-purpose processor may further include a storage medium. The processing circuit is configured to perform the storage step in the foregoing method embodiments by using the storage medium. The storage medium may store instructions executed by the processing circuit. The processing circuit is configured to execute the instructions stored in the storage medium, to perform the foregoing method embodiments.

Figure 12:
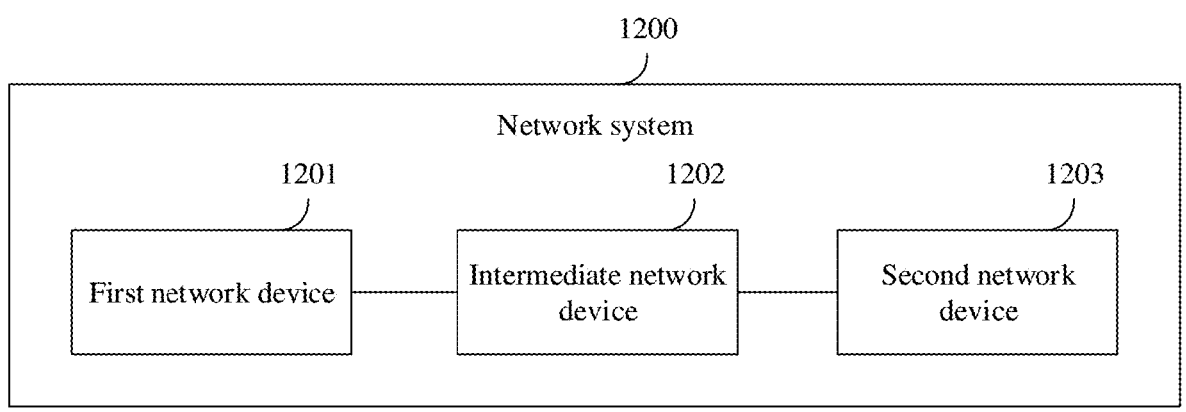
FIG. 12 is a schematic diagram of a structure of a network system 1200 according to an embodiment of this application.

Refer to FIG. 12. An embodiment of this application provides a network system 1200. The network system 1200 includes: a first network device 1201, an intermediate network device 1202, and a second network device 1203. Optionally, the first network device 1201 is a network device 900, a network device 1000, or a network device 1100, the intermediate network device 1202 is the network device 900, the network device 1000, or the network device 1100, and the second network device 1203 is the network device 900, the network device 1000, or the network device 1100.

Figure 13:
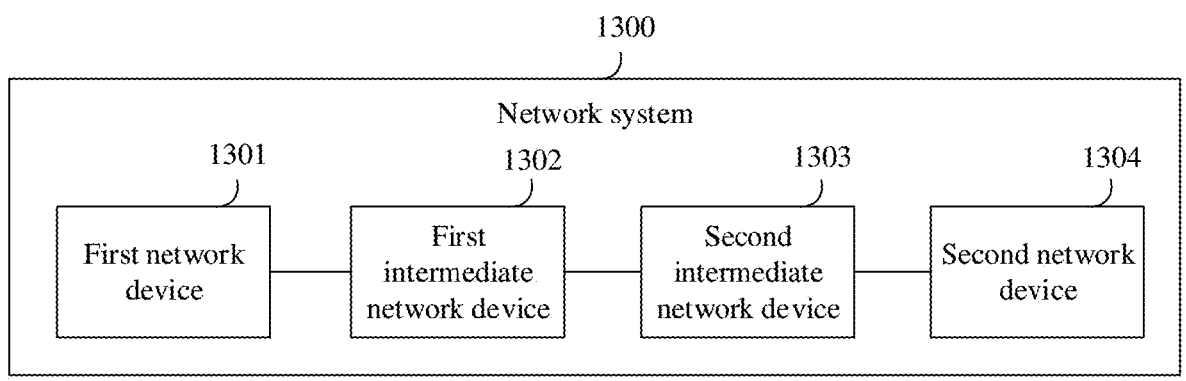
FIG. 13 is a schematic diagram of a structure of a network system 1300 according to an embodiment of this application.

Refer to FIG. 13. An embodiment of this application provides a network system 130o. The network system 1300 includes: a first network device 1301, a first intermediate network device 1302, a second intermediate network device 1303, and a second network device 1304. The first network device 1301, the first intermediate network device 1302, the second intermediate network device 1303, and the second network device 1304 may each be, for example, a physical device such as a router, a switch, or a gateway, or may be a virtual device that supports route issuing and packet forwarding. Specific types of the first network device and the second network device are not limited in this embodiment.

For example, when the network system 1300 is applied to the scenario shown in FIG. 1, the first network device 1301 may be, for example, the PE device located in the metropolitan area network shown in FIG. 1, the first intermediate network device 1302 may be, for example, the network device A shown in FIG. 1, the second intermediate network device 1303 may be, for example, the network device A shown in FIG. 1, and the second network device 1304 may be, for example, the cloud PE 1 device located in the backbone network shown in FIG. 1.

Optionally, the second intermediate network device 1303 and the second network device 1304 belong to a same IGP domain, the first network device 1301 and the first intermediate network device 1302 belong to a same IGP domain, and the first network device 1301 and the second network device 1304 belong to different IGP domains.

The first intermediate network device 1302 obtains a first traffic engineering tunnel and a second traffic engineering tunnel, where the first traffic engineering tunnel includes a first subnet prefix, and the second traffic engineering tunnel includes a second subnet prefix. The first traffic engineering tunnel and the second traffic engineering tunnel may be sent by a controller or another path computation device to the first intermediate network device 1302.

The first intermediate network device 1302 issues a first route advertisement packet to the second intermediate network device 1303, where the first route advertisement packet includes a third subnet prefix, and the first intermediate network device 1302 obtains the third subnet prefix by aggregating the first subnet prefix and the second subnet prefix. After obtaining the first traffic engineering tunnel and the second traffic engineering tunnel, the first intermediate network device 1302 may aggregate the first subnet prefix and the second subnet prefix to obtain an aggregation network segment, namely, a third subnet prefix, and advertise the aggregation network segment to the second intermediate network device 1303.

In an example, the second intermediate network device 1303 may obtain a first network slice identifier based on a path computation requirement corresponding to the third subnet prefix. The first network slice identifier may be used to compute a path that meets the path computation requirement corresponding to the third subnet prefix, and the first network slice identifier may be, for example, a FlexAlgo ID. In addition, the second intermediate network device 1303 may allocate a corresponding first SID to the first network slice identifier. The first SID may be, for example, an END SID. The second intermediate network device 1303 may associate the third subnet prefix with the first SID, and issue a second route advertisement packet, so that the second network device 1304 can receive the second route advertisement packet. The second route advertisement packet includes the third subnet prefix, the first SID, and the first network slice identifier, and the first SID corresponds to the first network slice identifier. In another example, the second intermediate network device 1303 may introduce the third subnet prefix into at least one network slice, where the at least one network slice includes a first network slice and a second network slice. The second intermediate network device 1303 issues a third route advertisement packet, where the third route advertisement packet includes the third subnet prefix and an identifier of the second network slice. The second network device 1304 may obtain the third route advertisement packet, and determine a corresponding egress for the third subnet prefix based on the identifier of the second network slice. In other words, for the second network device 1304, the second network device 1304 may receive different route advertisement packets issued by the second intermediate network device 1303, and different route advertisement packets include a same subnet prefix and different network slice identifiers. The second network device 1304 may select a different network slice identifier based on a forwarding requirement of an obtained packet to determine a corresponding egress, so that a forwarding path of the packet can meet a requirement, for example, a low-latency requirement or a high-bandwidth requirement.

The second intermediate network device 1303 receives a first packet sent by the second network device 1304, where there is a longest match between a destination address of the first packet and the third subnet prefix.

In an example, the first packet may further include a first SID, and the second intermediate network device 1303 may determine a corresponding third subnet prefix based on the first SID in the first packet.

In another example, a hop-by-hop header of the first packet carries the identifier of the second network slice. The identifier of the second network slice is carried in the hop-by-hop header of the first packet, so that a network device between the second network device 1304 and the second intermediate network device 1303 may select a corresponding egress based on the identifier of the second network slice to forward the first packet. That is, the first packet can be sent in the second network slice.

The second intermediate network device 1303 obtains a second packet based on the first packet, and sends the second packet to the first intermediate network device 1302. Optionally, the first packet may include the first SID, and the second intermediate network device may determine a corresponding egress based on the first network slice identifier corresponding to the first SID. Alternatively, the hop-by-hop header of the first packet carries the identifier of the second network slice, and the second intermediate network device 1303 may determine a corresponding egress based on the identifier of the second network slice.

An embodiment of this application provides a computer program product. When the computer program product runs on a first network device, an intermediate network device, or a second network device, the first network device, the intermediate network device, or the second network device is enabled to perform the method 200, the method 300, the method 400, the method 600, and the method 700 in the foregoing method embodiments.

The network devices in the foregoing product forms separately have any function of the first network device, the intermediate network device, or the second network device in the foregoing method embodiments. Details are not described herein again.

A person of ordinary skill in the art may be aware that, method steps and units described with reference to embodiments disclosed in this specification may be implemented by electronic hardware, computer software, or a combination thereof. To clearly describe the interchangeability between the hardware and the software, the foregoing has generally described steps and compositions of each embodiment based on functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in another manner. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separate, and components displayed as units may or may not be physical units, in other words, may be located in one position, or may be distributed on a plurality of network units. Some or all of the units may be selected based on an actual requirement to achieve the objectives of the solutions of embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the method in embodiments of this application. The foregoing storage medium includes any medium that can store program code, such as a USB flash drive, a removable hard disk, a read-only memory, a random access memory, a magnetic disk, or an optical disc.

What is claimed is:

1. A method, comprising:
   obtaining, by a first network device, first routing information of a first route, wherein the first routing information comprises a first route prefix; and
   advertising, by the first network device, second routing information of a second route, wherein the advertised second routing information comprises a subnet prefix and a path identifier, a range of the subnet prefix comprises a range of the first route prefix, the path identifier comprises a network slice identifier, the network slice identifier comprises a flexible algorithm identifier corresponding to a network slice, and the path identifier corresponds to a traffic engineering tunnel.

2. The method according to claim 1, further comprising:
   obtaining, by the first network device, third routing information of a third route, wherein the third routing information comprises a second route prefix; and
   obtaining, by the first network device, the subnet prefix based on the second route prefix and the first route prefix.

3. The method according to claim 1, wherein the second routing information is advertised by using an interior gateway protocol (IGP) packet.

4. The method according to claim 1, wherein the first routing information is advertised by a second network device.

5. The method according to claim 4, wherein the second network device and the first network device belong to different interior gateway protocol (IGP) domains.

6. An apparatus, comprising:
   at least one processor; and
   at least one non-transitory computer-readable storage medium storing a program to be executed by the at least one processor, the program including instructions to:
      obtain first routing information, wherein the first routing information comprises a first route prefix; and
      advertise second routing information, wherein the second routing information comprises a subnet prefix and a path identifier, a range of the subnet prefix comprises a range of the first route prefix, the path identifier comprises a network slice identifier, the network slice identifier comprises a flexible algorithm identifier corresponding to a network slice, and the path identifier corresponds to a traffic engineering tunnel.

7. The apparatus according to claim 6, wherein the instructions further include instructions to:
   obtain third routing information, wherein the third routing information comprises a second route prefix; and
   obtain the subnet prefix based on the second route prefix and the first route prefix.

8. The apparatus according to claim 6, wherein the second routing information is advertised by using an interior gateway protocol (IGP) packet.

9. The apparatus according to claim 6, wherein the first routing information is advertised by a second network device.

10. A non-transitory storage medium storing a program, wherein when the program is executed by one or more processors, the execution causes the one or more processors to perform operations, the operations comprising:
   obtaining first routing information, wherein the first routing information comprises a first route prefix; and
   advertising second routing information, wherein the second routing information comprises a subnet prefix and a path identifier, a range of the subnet prefix comprises a range of the first route prefix, the path identifier comprises a network slice identifier, the network slice identifier comprises a flexible algorithm identifier corresponding to a network slice, and the path identifier corresponds to a traffic engineering tunnel.

11. The non-transitory storage medium according to claim 10, wherein the operations further comprise:
obtaining third routing information, wherein the third routing information comprises a second route prefix; and
obtaining the subnet prefix based on the second route prefix and the first route prefix.

12. The non-transitory storage medium according to claim 10, wherein the second routing information is advertised by using an interior gateway protocol (IGP) packet.

13. The non-transitory storage medium according to claim 10, wherein the first routing information is advertised by a second network device.

14. The non-transitory storage medium according to claim 13, wherein the second network device and a first network device to which the one or more processors are applied belong to different interior gateway protocol (IGP) domains.

15. The apparatus according to claim 9, wherein the second network device and the apparatus belong to different interior gateway protocol (IGP) domains.

16. The apparatus according to claim 9, wherein the second network device and the apparatus belong to different Border Gateway Protocol (BGP) domains.

17. The method according to claim 4, wherein the second network device and the first network device belong to different Border Gateway Protocol (BGP) domains.

18. The non-transitory storage medium according to claim 13, wherein the second network device and a first network device to which the one or more processors are applied belong to different Border Gateway Protocol (BGP) domains.

19. The method according to claim 1, wherein the first network device maintains a mapping between a plurality of flexible algorithm identifiers and segment identifiers.

* * * * *